United States Patent
Cai et al.

(10) Patent No.: US 11,143,280 B2
(45) Date of Patent: Oct. 12, 2021

(54) HYDROKINETIC TORQUE COUPLING DEVICE WITH CENTERED LOCK-UP CLUTCH

(71) Applicant: Valeo Kapec Co., Ltd., Daegu (KR)

(72) Inventors: Liguang Cai, Daegu (KR); Sungchul Lee, Daegu (KR); Suhas Kulkarni, Daegu (KR); Seiji Momoi, Daegu (KR); Atsushi Inoue, Daegu (KR); Zane Yang, Daegu (KR); Vijayakumar Velayudham, Daegu (KR); Shintaro Ishizaka, Daegu (KR); Yoshiaki Mizuta, Daegu (KR)

(73) Assignee: VALEO KAPEC CO. LTD., Daegu (KR)

( * ) Notice: Subject to any disclaimer, the term of this patent is extended or adjusted under 35 U.S.C. 154(b) by 143 days.

(21) Appl. No.: 16/564,638

(22) PCT Filed: Mar. 12, 2018

(86) PCT No.: PCT/KR2018/002903
§ 371 (c)(1),
(2) Date: Sep. 9, 2019

(87) PCT Pub. No.: WO2018/164555
PCT Pub. Date: Sep. 13, 2018

(65) Prior Publication Data
US 2021/0140524 A1  May 13, 2021

Related U.S. Application Data

(60) Provisional application No. 62/469,996, filed on Mar. 10, 2017, provisional application No. 62/482,984, filed on Apr. 7, 2017.

(51) Int. Cl.
*F16H 45/02* (2006.01)
*F16H 41/28* (2006.01)

(52) U.S. Cl.
CPC ............. *F16H 45/02* (2013.01); *F16H 41/28* (2013.01); *F16H 2045/0205* (2013.01);
(Continued)

(58) Field of Classification Search
CPC .. F16H 45/02; F16H 41/28; F16H 2045/0215; F16H 2045/0205;
(Continued)

(56) References Cited

U.S. PATENT DOCUMENTS 6,938,744 B2  9/2005  Tomiyama
8,025,136 B2  9/2011  Uhler
(Continued)

FOREIGN PATENT DOCUMENTS

EP     1977141 B1      11/2009
WO   WO2015158496 A1  10/2015

OTHER PUBLICATIONS

European Search Report dated Nov. 17, 2020 from corresponding European Patent Application No. 18763434.0; 8 pages.

*Primary Examiner* — Mark A Manley
(74) *Attorney, Agent, or Firm* — Berenato & White, LLC

(57) ABSTRACT

A hydrokinetic torque-coupling device includes an impeller wheel, a turbine wheel, a stator, a casing, a stationary shaft operatively coupled to the stator so that a driven shaft axially extends through the stationary shaft, a first fluid passage formed axially through the driven shaft, a second fluid passage formed between the stationary shaft and the driven shaft, a third fluid passage formed radially adjacent to the stationary shaft, and a lock-up clutch including a piston housing member non-moveably attached to a center hub of the casing, and a lockup piston mounted to the center hub so as to be axially movable along the center hub. The first fluid passage hydraulically connected to a first hydraulic chamber. The second fluid passage hydraulically connected to a
(Continued)

second hydraulic chamber. The third fluid passage hydraulically connected to a torus chamber defined between the impeller shell and the turbine shell.

22 Claims, 22 Drawing Sheets

(52) U.S. Cl.
CPC ........... *F16H 2045/0215* (2013.01); *F16H 2045/0263* (2013.01); *F16H 2045/0273* (2013.01)

(58) Field of Classification Search
CPC ..... F16H 2045/0263; F16H 2045/0273; F16H 2045/021
See application file for complete search history.

(56) References Cited

U.S. PATENT DOCUMENTS

| | | |
|---|---|---|
| 8,453,439 B2 | 6/2013 | Peri |
| 8,939,267 B2 | 1/2015 | Iwashita et al. |
| 10,309,485 B2 | 6/2019 | Hertel et al. |
| 2008/0257675 A1 | 10/2008 | Sasse et al. |
| 2013/0056319 A1 | 3/2013 | Lindemann et al. |
| 2014/0262666 A1 | 9/2014 | Ushio et al. |
| 2015/0008086 A1 | 1/2015 | Mototsune et al. |
| 2016/0017971 A1 | 1/2016 | Sayre et al. |
| 2016/0208885 A1* | 7/2016 | Takikawa ................ F16H 45/02 |
| 2016/0258520 A1* | 9/2016 | Schrader ................ F16C 17/12 |
| 2017/0023116 A1 | 1/2017 | Jewell |

\* cited by examiner

[Fig. 1]
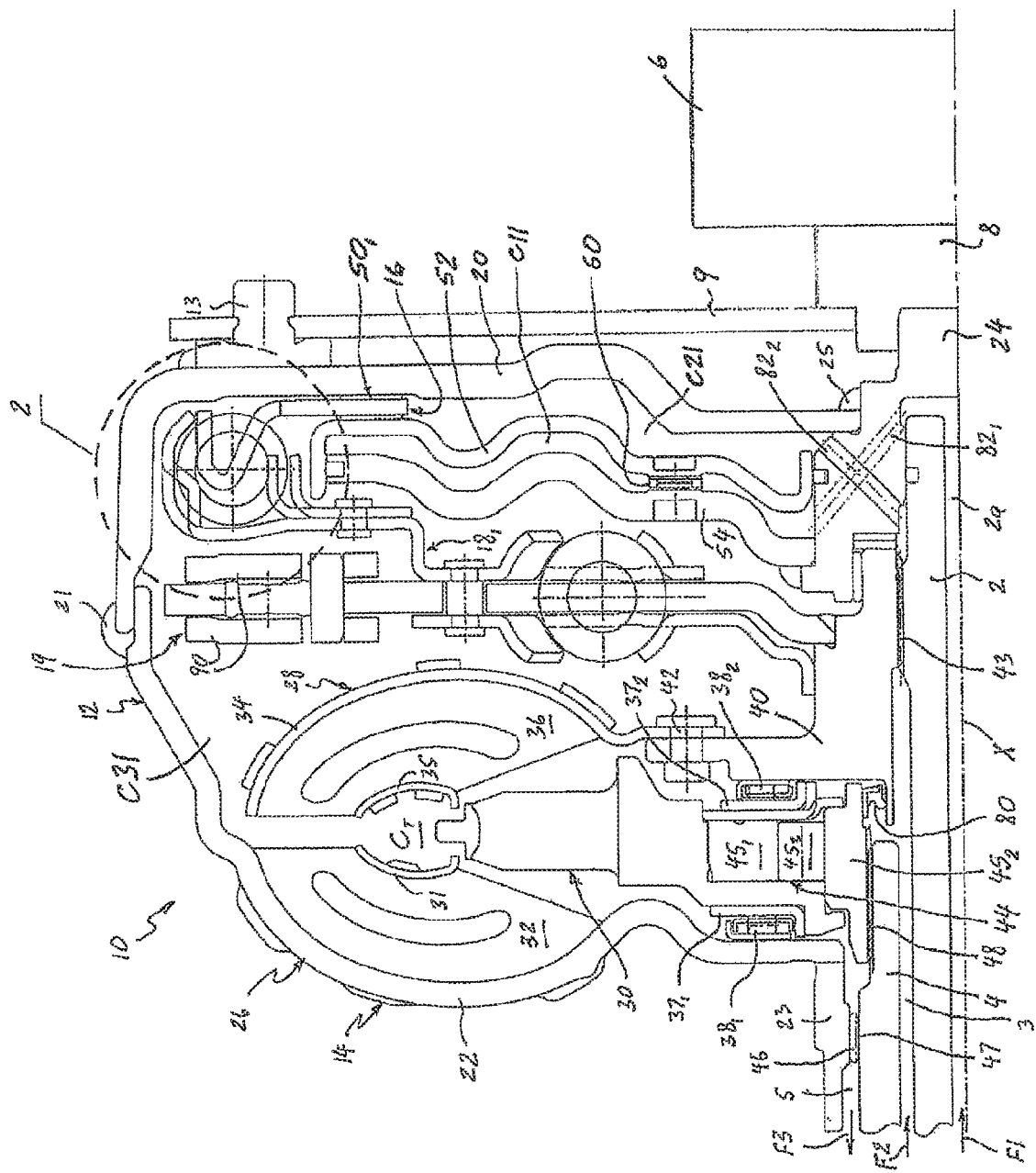

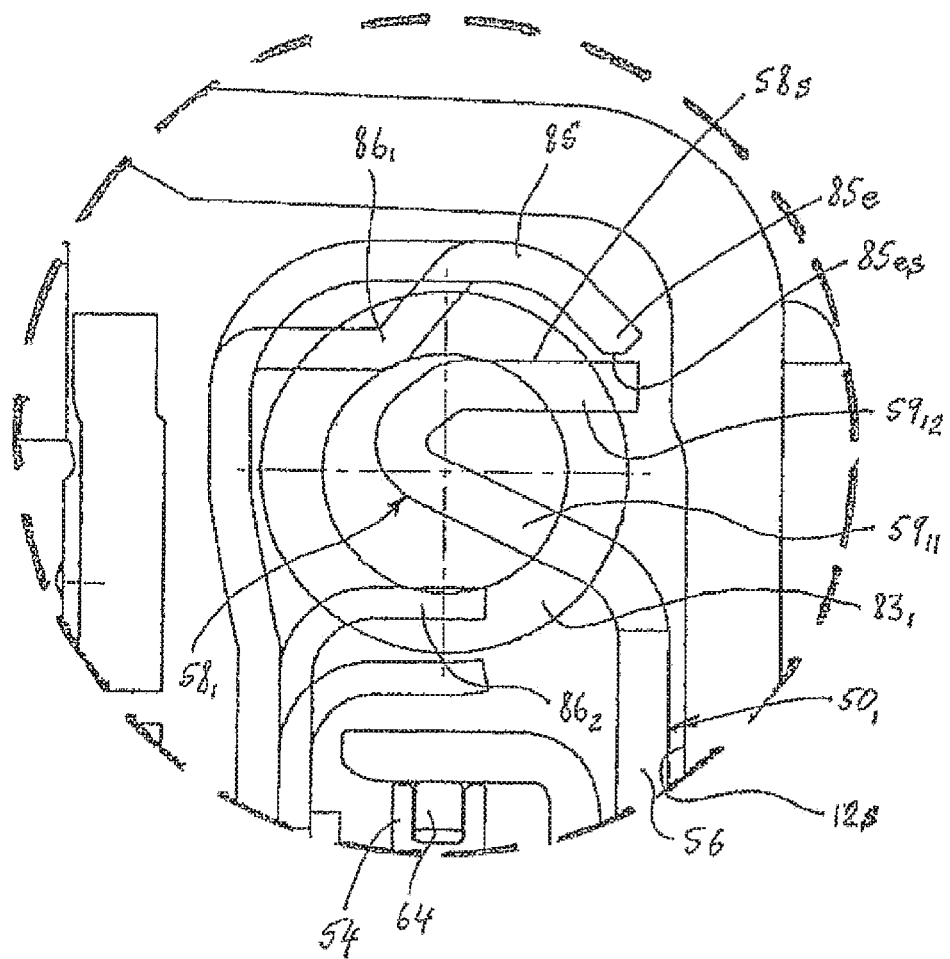
[Fig. 2]

[Fig. 3]
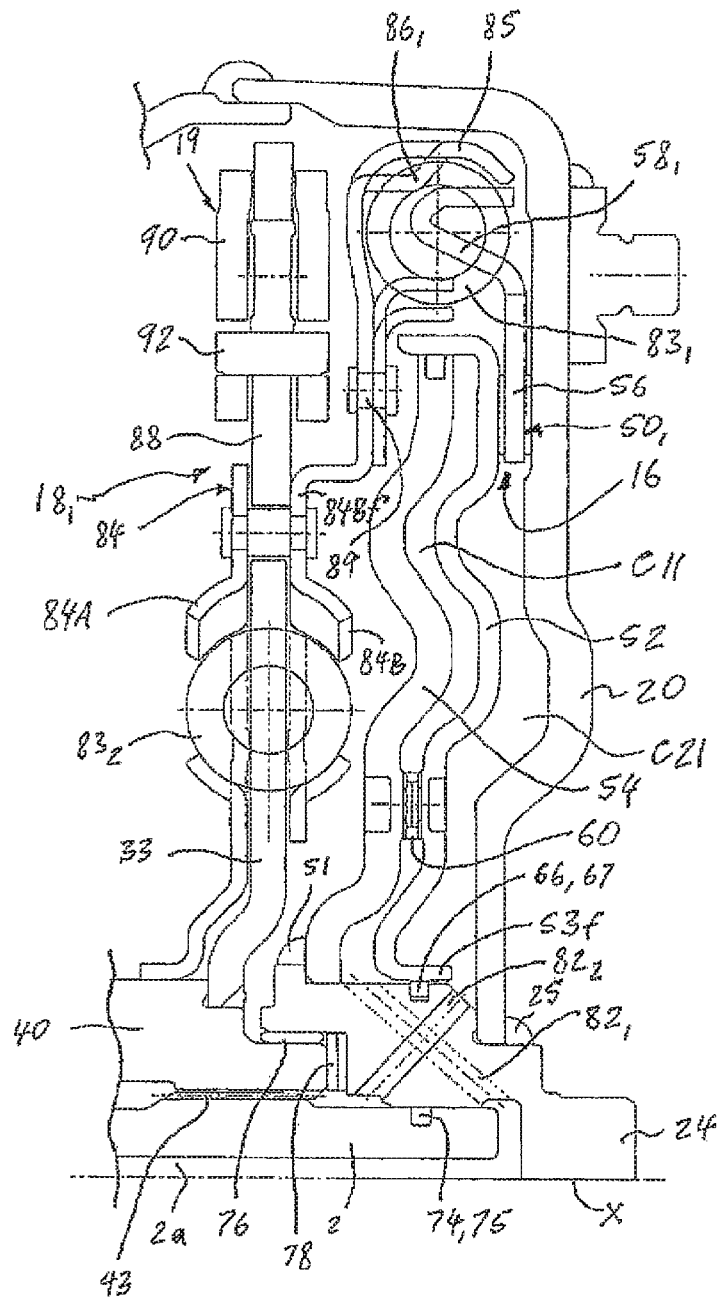

[Fig. 4]
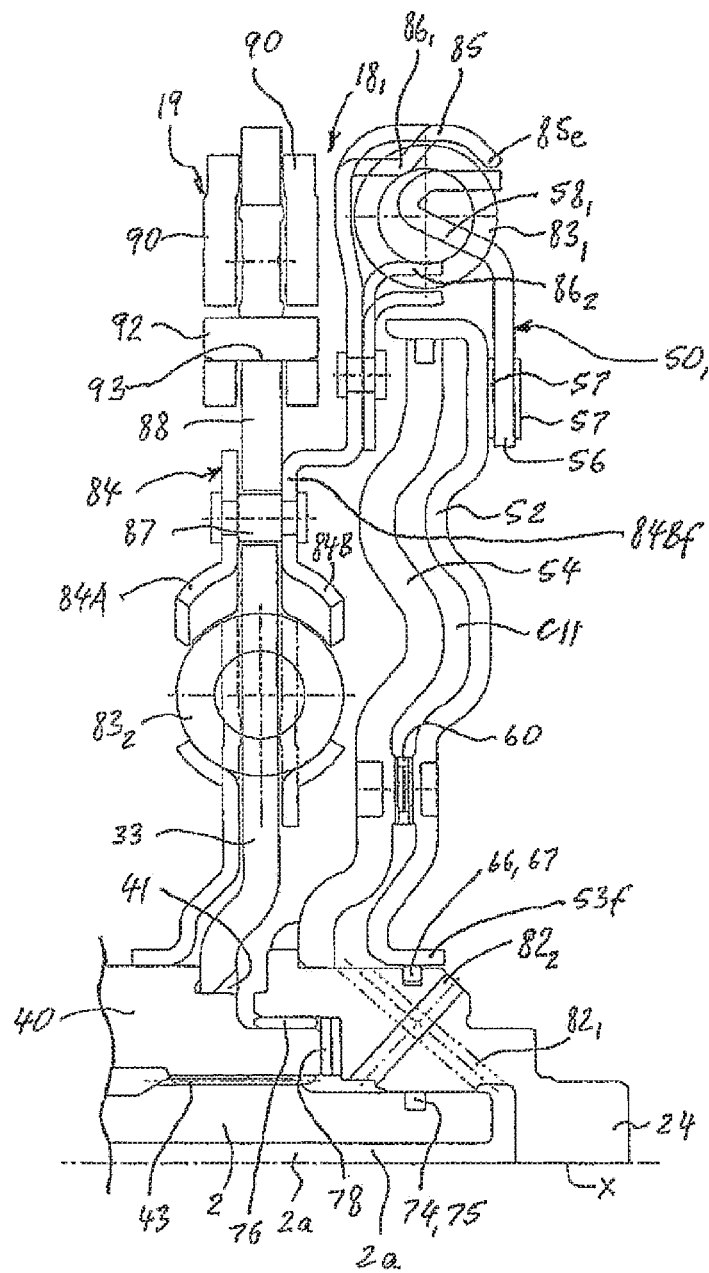

[Fig. 5A]
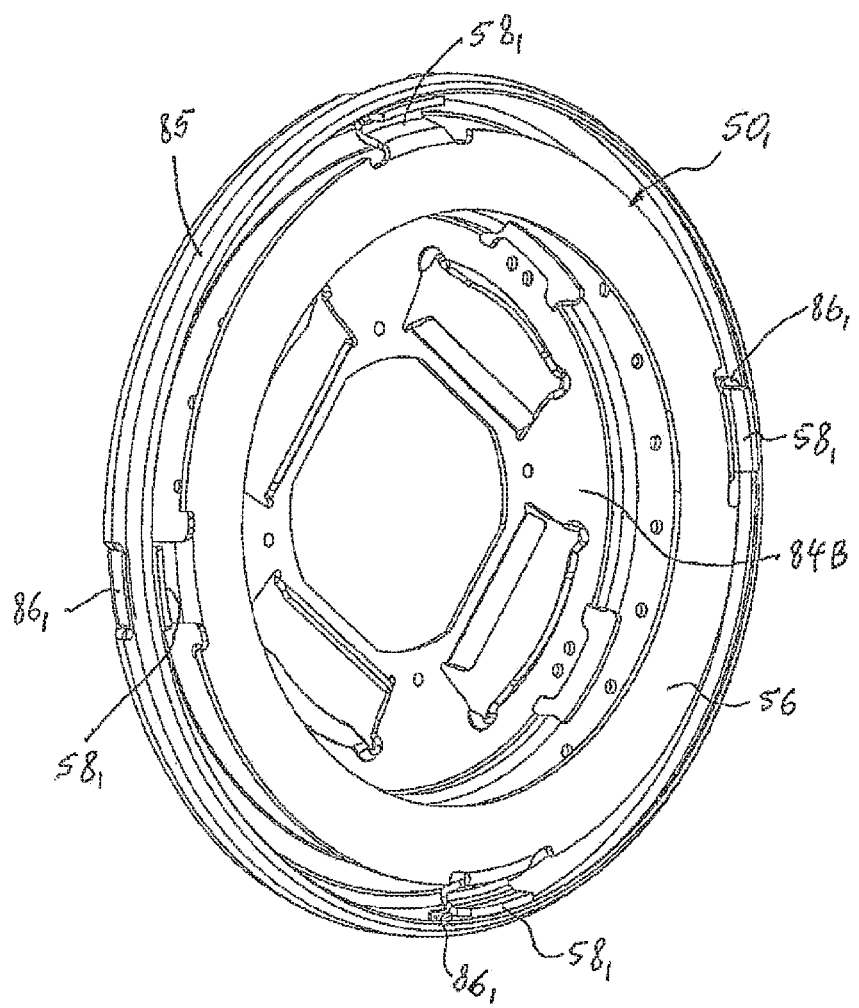

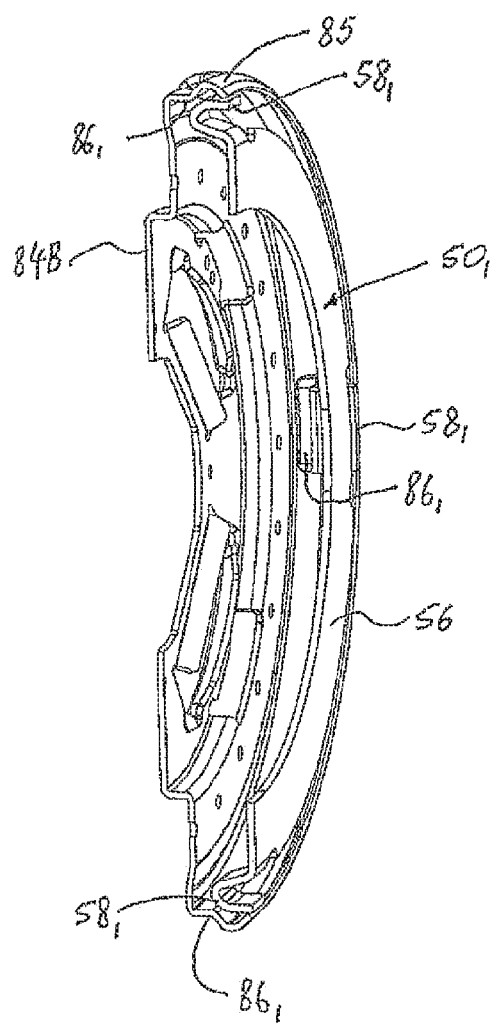
[Fig. 5B]

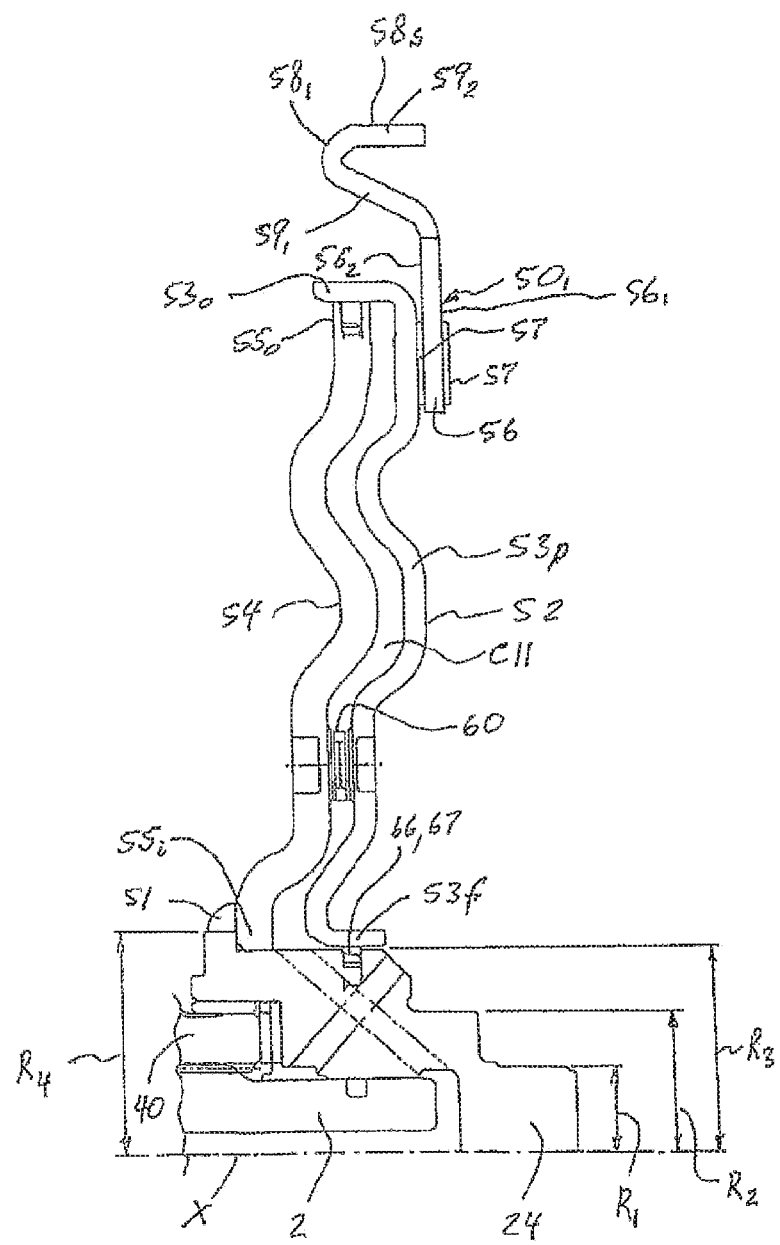
[Fig. 6]

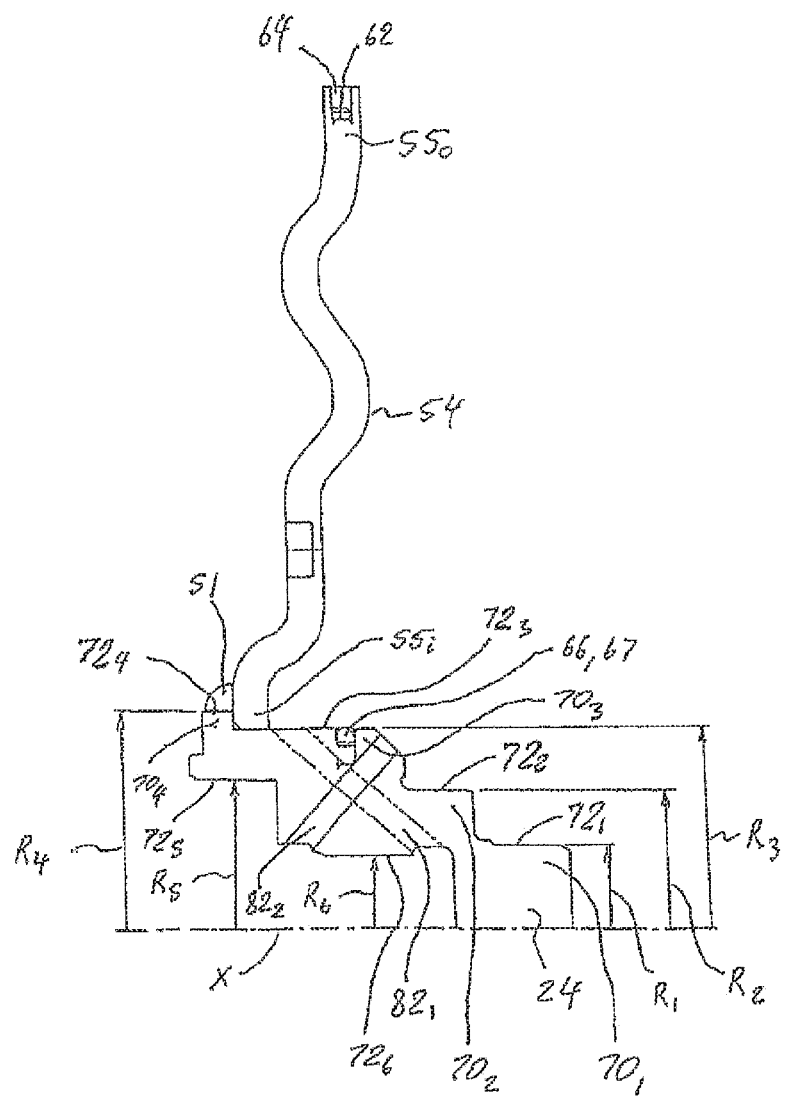
[Fig. 7]

[Fig. 8]
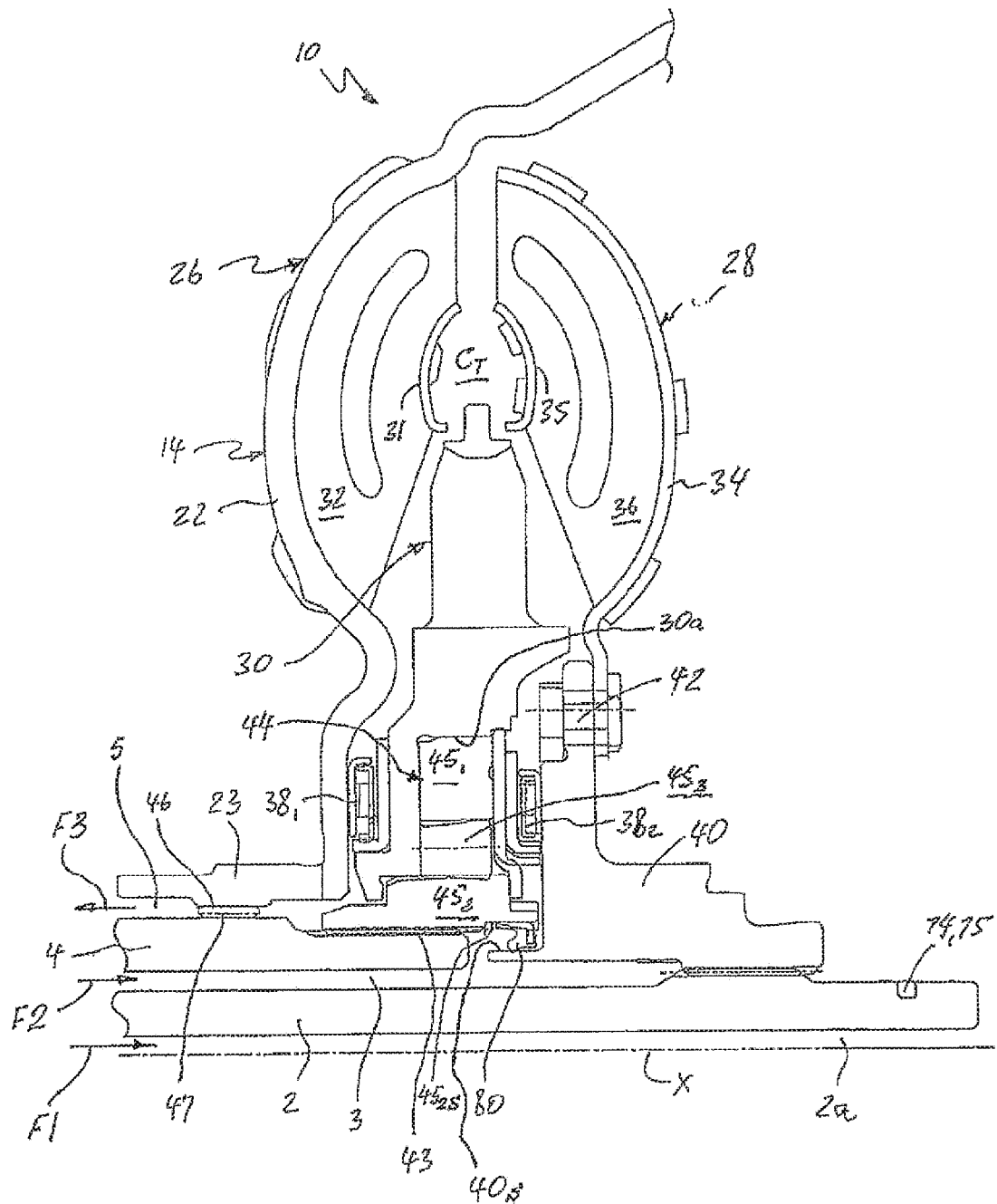

[Fig. 9]
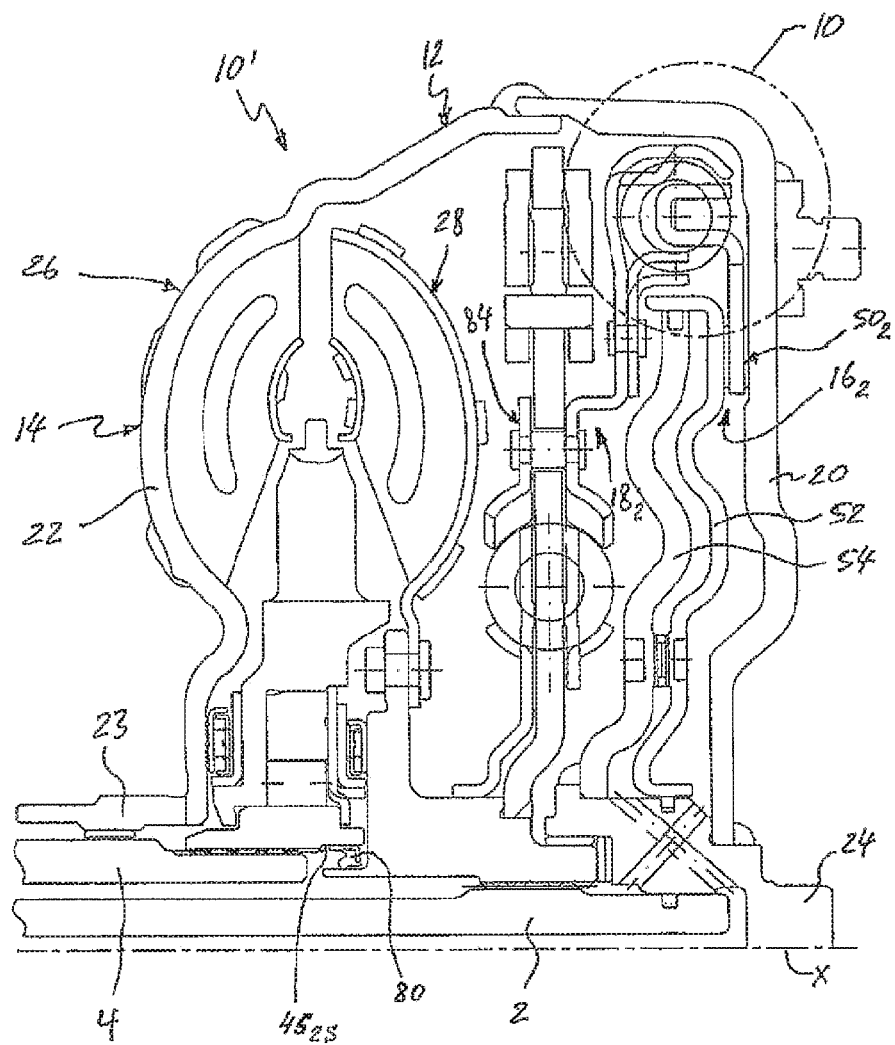

[Fig. 10]
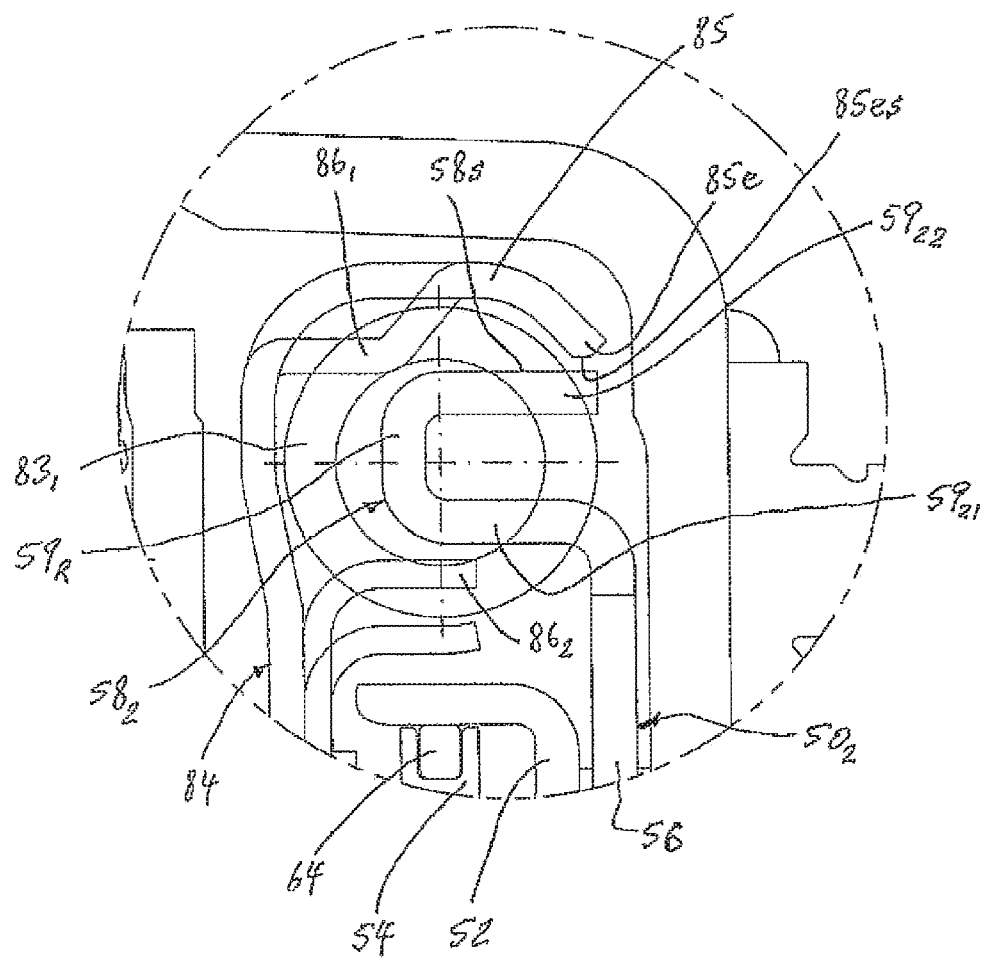

[Fig. 11A]
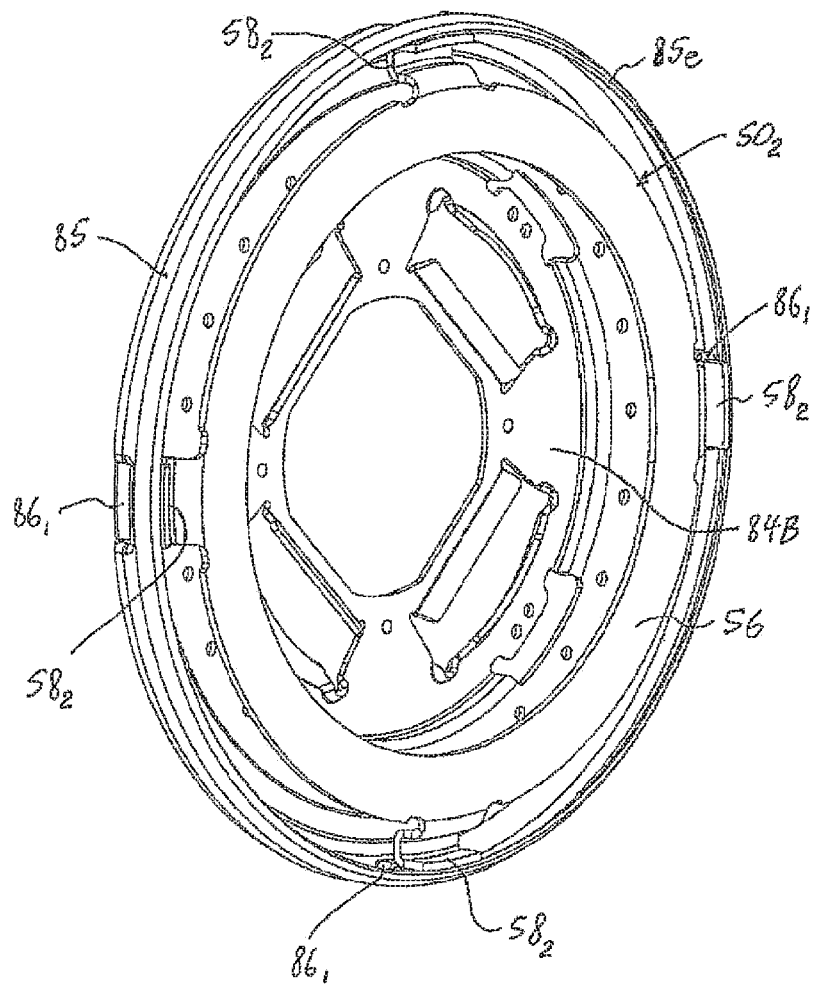

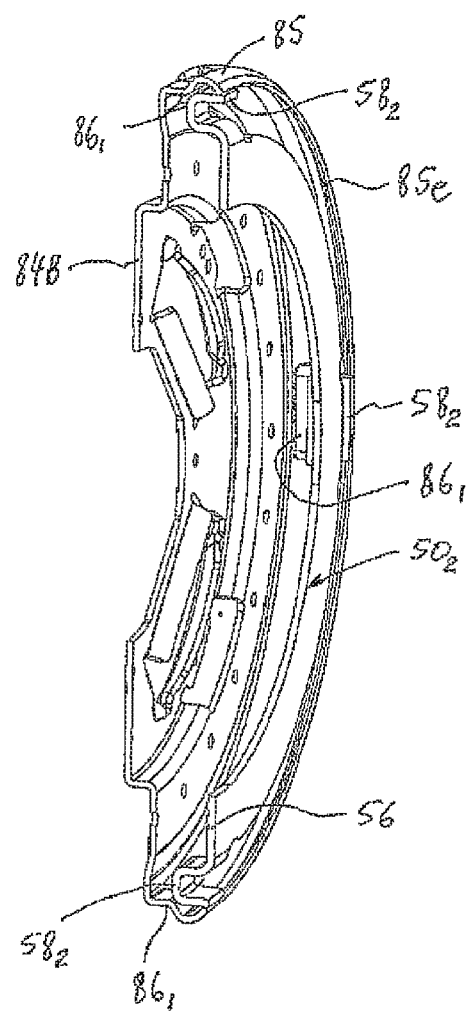
[Fig. 11B]

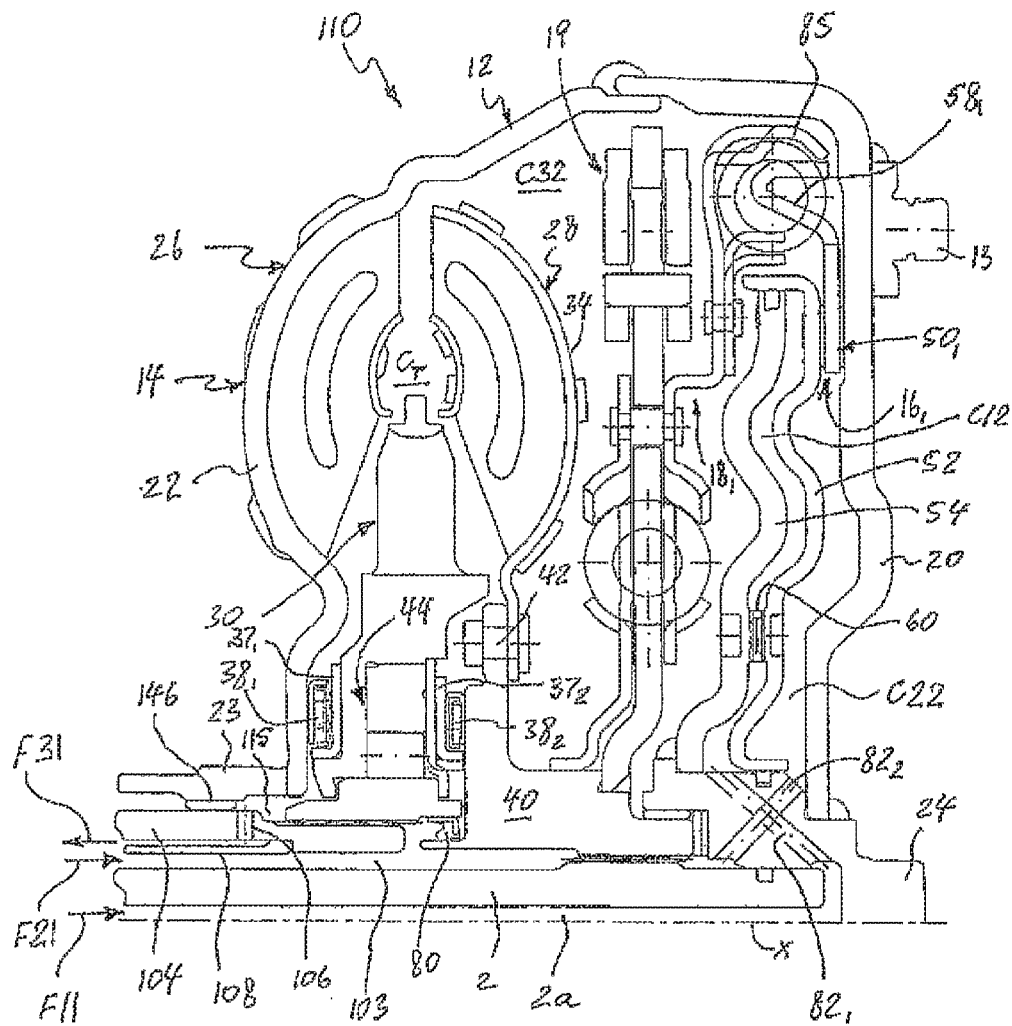
[Fig. 12]

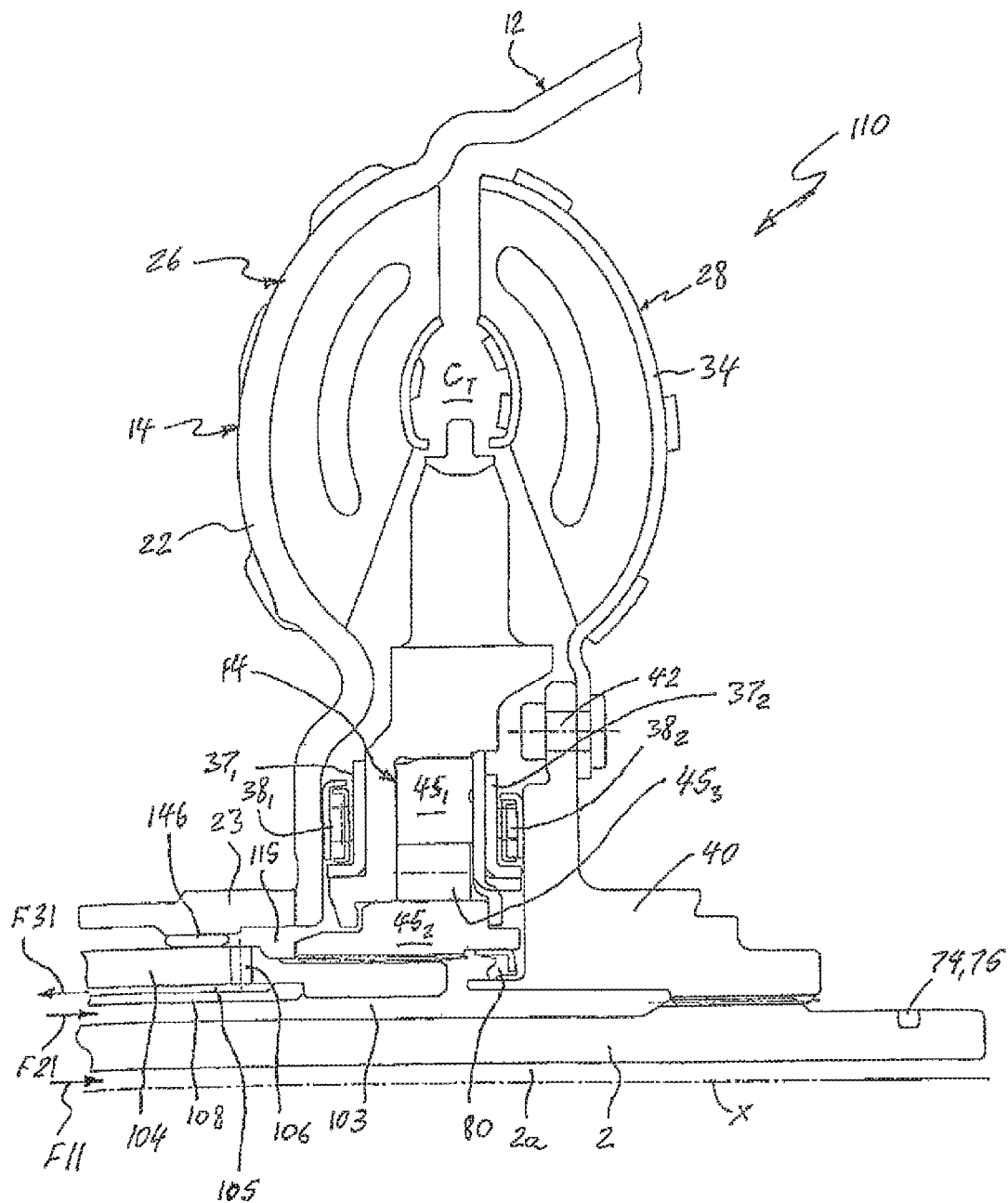
[Fig. 13]

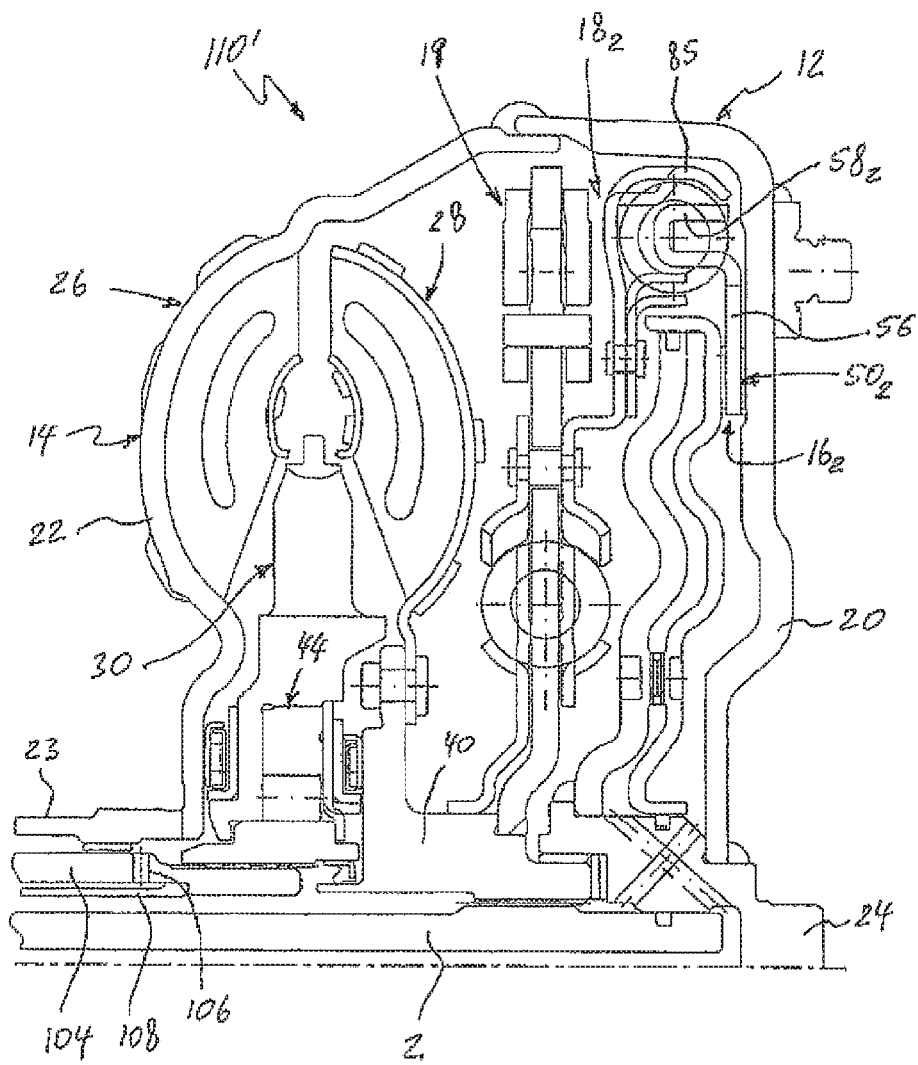
[Fig. 14]

[Fig. 15]
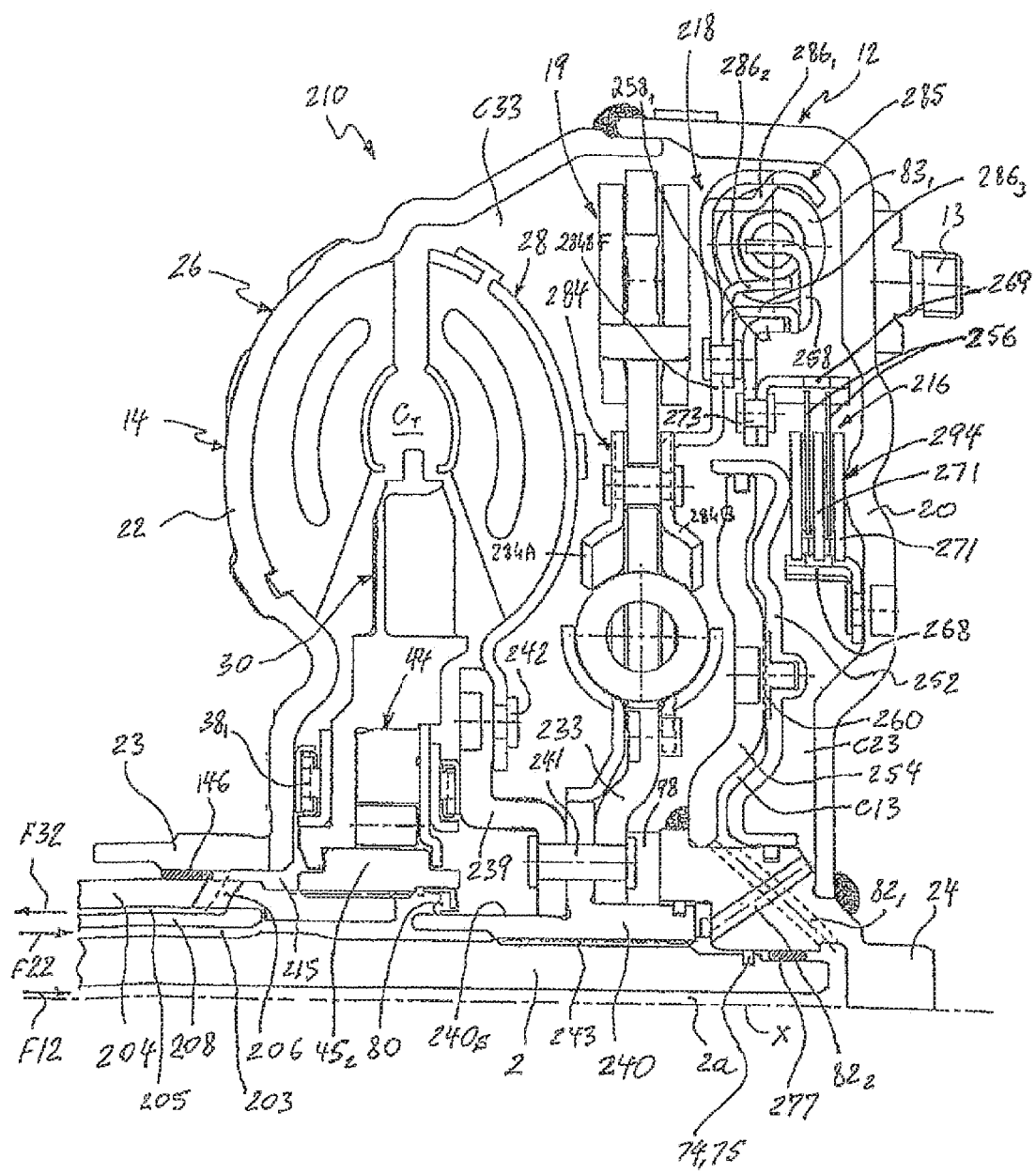

[Fig. 16]
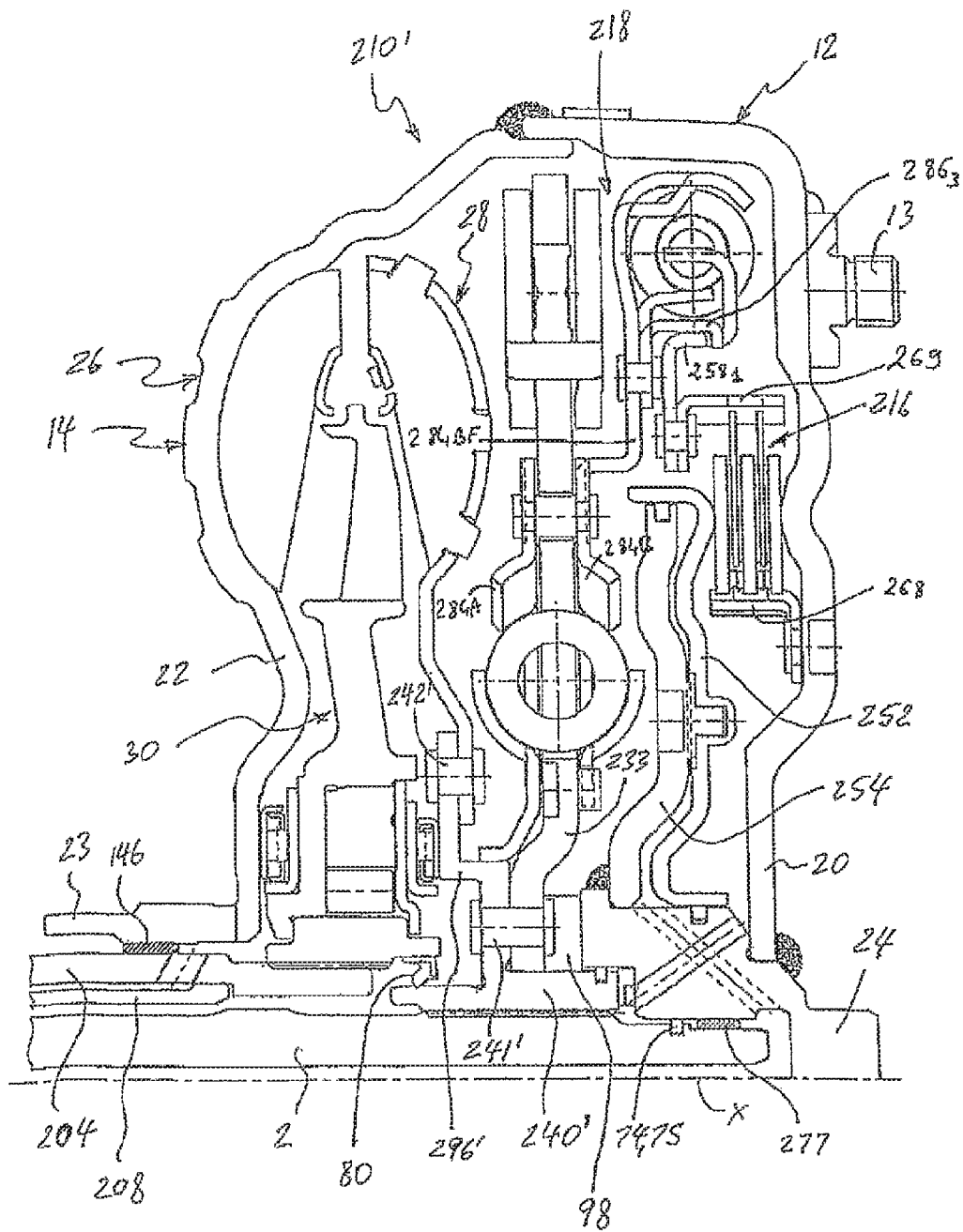

[Fig. 17]
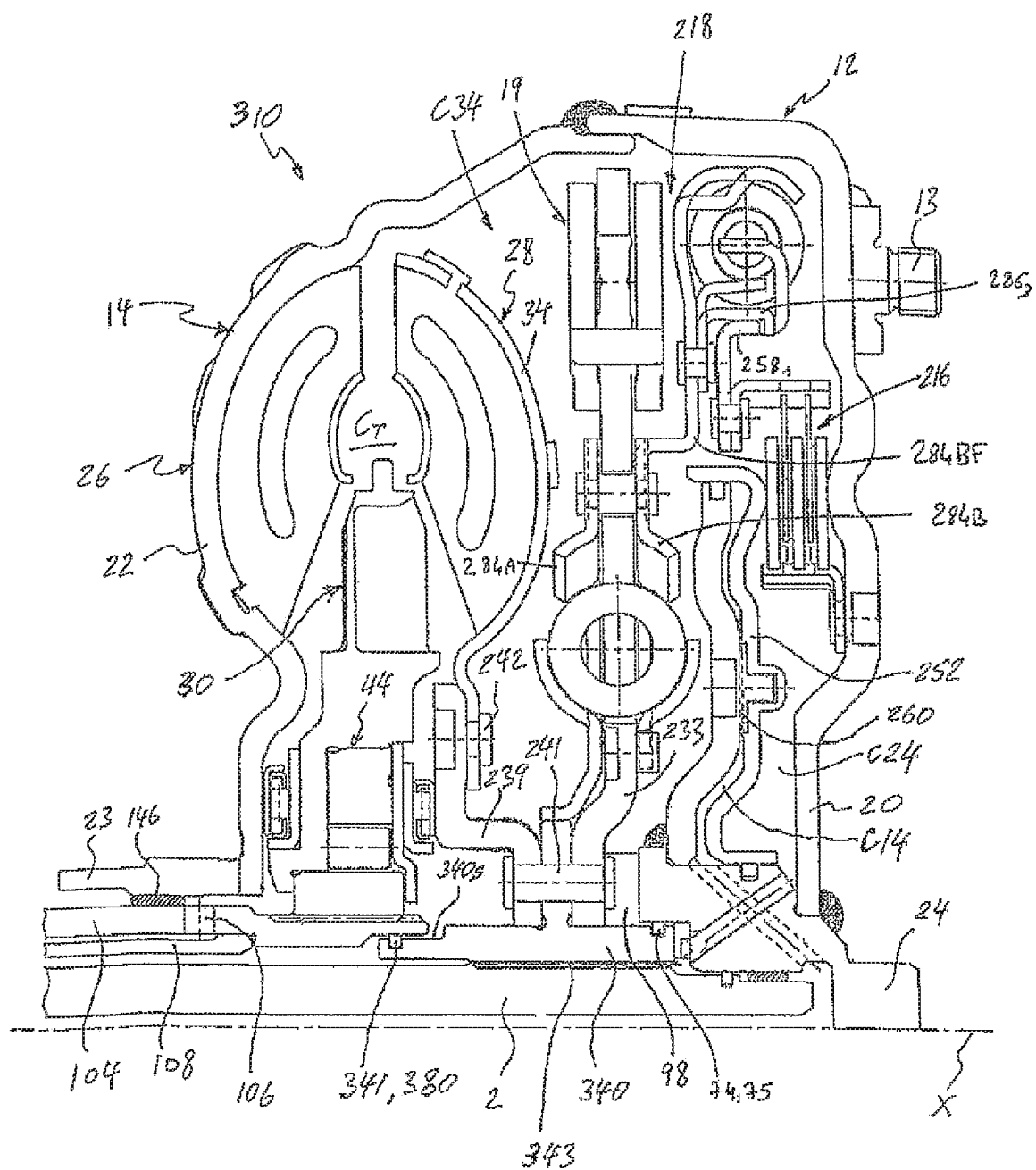

[Fig. 18]
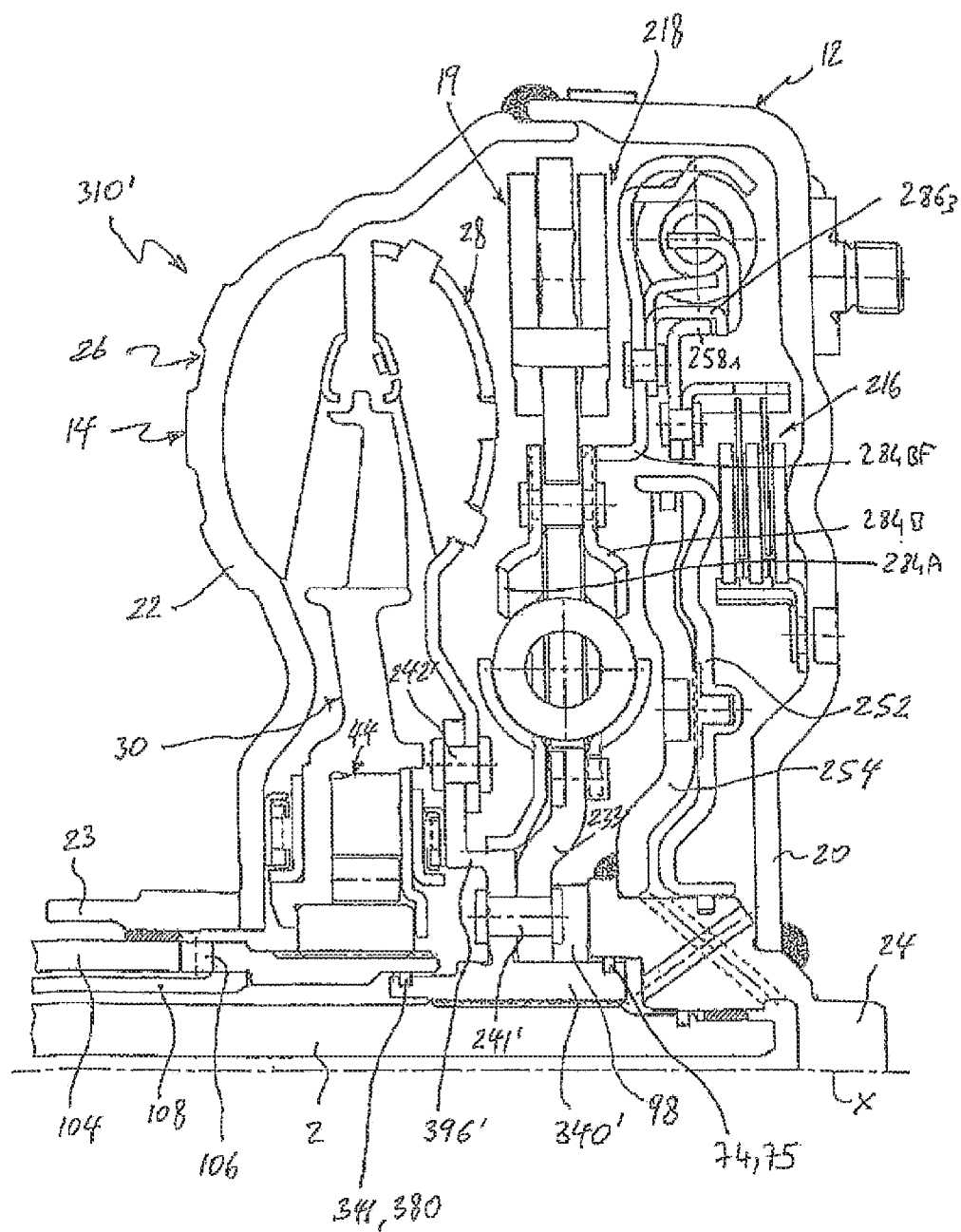

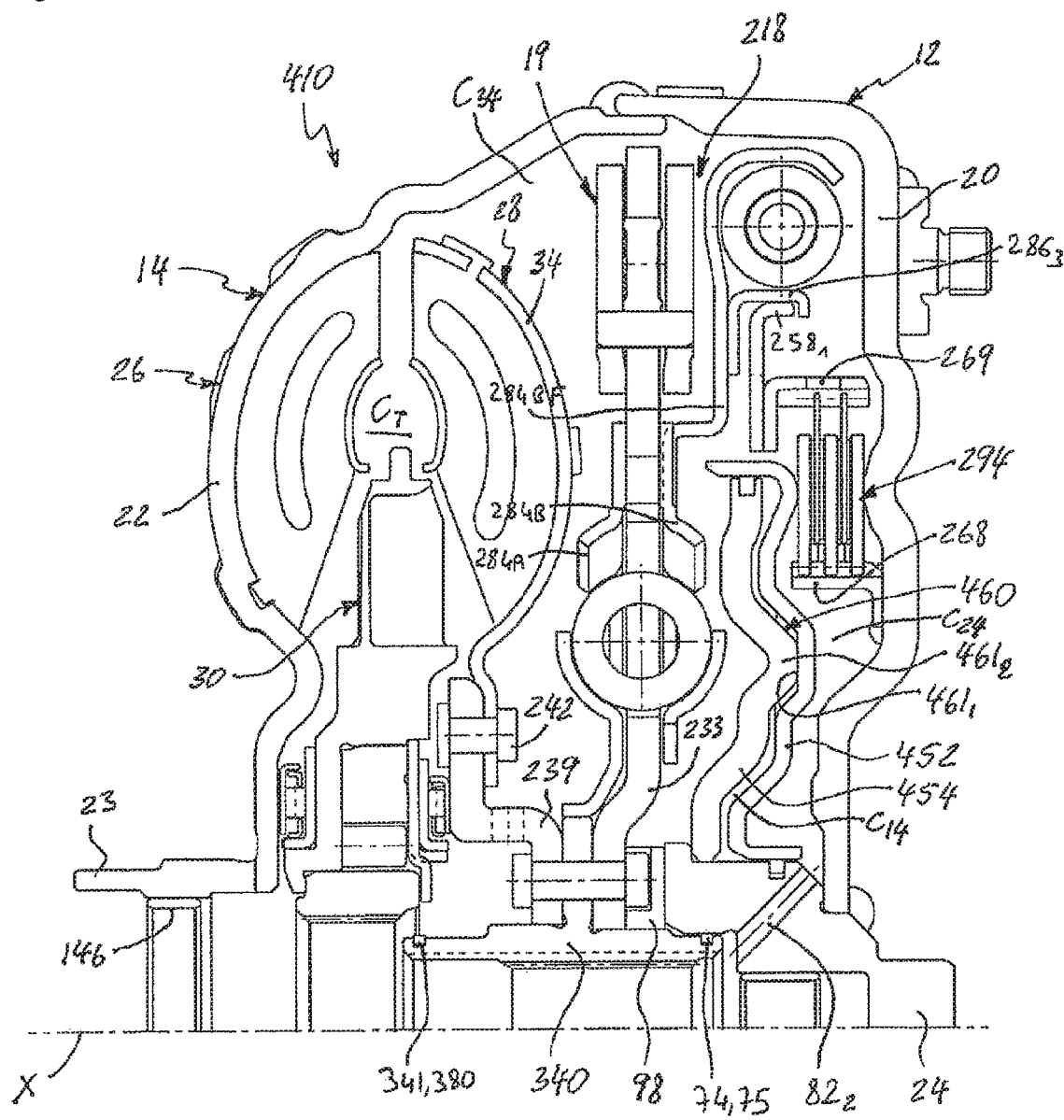
[Fig. 19]

[Fig. 20]
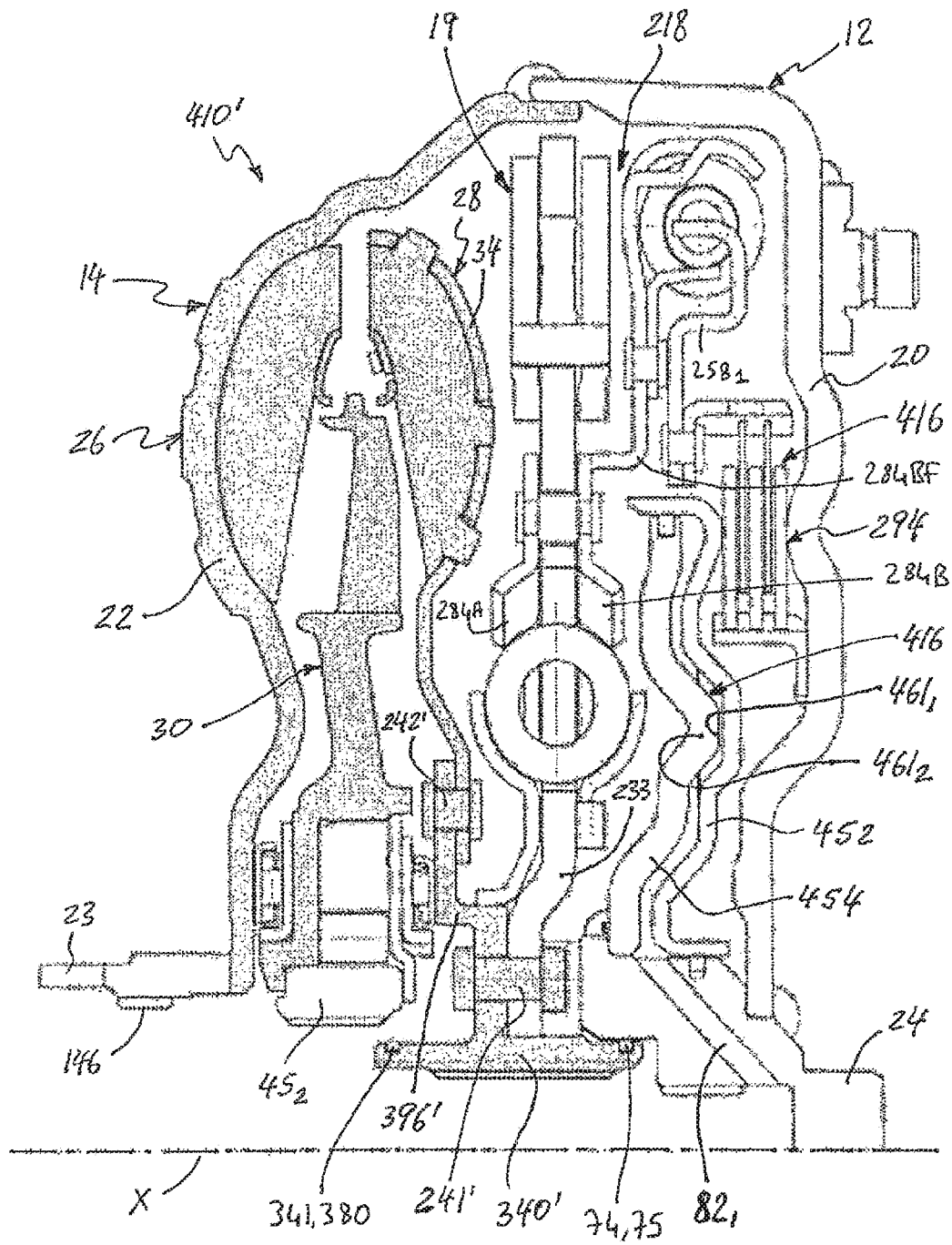

HYDROKINETIC TORQUE COUPLING DEVICE WITH CENTERED LOCK-UP CLUTCH

TECHNICAL FIELD

This invention generally relates to hydrokinetic torque-coupling devices and, more particularly, to hydrokinetic torque-coupling devices having three fluid flow paths, and including a casing with a center hub, and a lock-up clutch with a piston and a piston housing member mounted to the center hub.

BACKGROUND ART

In the evolution of automobiles from motorized carriages to highly regulated devices for mass transportation, there has been a continuous pursuit of refinement of the basic combination of elements that comprise the automobile. One aspect of this refinement has been the transmission of torque from the engine to the drive system of the vehicle. This transmission of torque has, throughout, been accomplished by various gear or chain driven transmission systems alternatively drivingly connected to, or disconnected from, a source of motive power. The connection/disconnection feature of the drive system is accomplished by means of a clutch. Since the mid-1950's, especially in the United States, this clutch has been a fluid clutch or torque converter. Owing to the inclusion of this fluid torque transmitting coupling, enhanced refinement of the driving experience was obtained, but this refinement came at the expense of lost efficiency. To address this lost efficiency, the torque converter has become, itself, an object of greater refinement and recaptured efficiency. Frequently, a modern era torque converter will include a friction clutch assembly associated with a driven member of the torque converter which, at preset loads and speeds, eliminates the fluid transmission of torque and replaces the fluid coupling with a direct mechanical friction coupling. This feature is commonly referred to as a lock-up clutch.

In the era of the lock-up clutch equipped torque converter, efficiency has been recaptured, but a loss of refinement has also occurred when the clutch is in lock-up mode and when it is transitioning into and out of lock-up mode. This is especially true when the lock-up clutch elements become worn and tolerances between various rotating and fixed elements increase/decrease in accord with their respective wear patterns. To alleviate some of the mechanical coarseness created by the incorporation of lock-up clutches into torque converters, the clutch systems, themselves, have increased in complexity. For example, the inclusion of a driven intermediate plate, and the further inclusion of elastic damping members to keep driveline torque oscillations within acceptable parameters, adds rotational mass and complexity to the torque converter sub-assemblies. This added complexity creates the potential for a loss of refinement through vibration caused, in part, by unbalanced decentered rotation of the various components. In addition, it is common for the elastic torque transmitting member equipped devices to, over time and with use, develop rattles and other noises that create a perception of low integrity of the torque converter device. In addition, the assembly of these increasingly complex clutch and damper systems requires more time, patience, and precision. Examples of such torque converters equipped with a lock-up clutch and elastic torque transmission element through an intermediate plate are shown in U.S. Pat. Nos. 8,453,439; 8,025,136; and, 6,938,744.

While conventional hydrokinetic torque-coupling devices, including but not limited to those discussed above, have proven to be acceptable for vehicular driveline applications and conditions, improvements that may enhance their performance and cost are possible.

DISCLOSURE OF INVENTION

Solution to Problem

According to a first aspect of the invention, there is provided a hydrokinetic torque-coupling device for coupling together a driving shaft and a driven shaft. The torque-coupling device comprises an impeller wheel, a turbine wheel, a stator interposed axially between the impeller wheel and the turbine wheel, and a casing. The casing includes a cover shell, an impeller shell non-moveably secured to the cover shell, and a center hub non-moveably attached to the cover shell of the casing. The hydrokinetic torque-coupling device further comprises a hollow stationary stator shaft operatively coupled to the stator, a first hydraulic fluid passage formed axially through the driven shaft, a second hydraulic fluid passage formed radially between the stationary stator shaft and the driven shaft, and a third hydraulic fluid passage formed radially adjacent to the stationary stator shaft and radially spaced from the second hydraulic fluid passage. The driven shaft axially extends through the stationary stator shaft. The hydrokinetic torque-coupling device additionally comprises a lock-up clutch inter-connecting the turbine wheel and the casing. The lock-up clutch includes a piston housing member non-moveably attached to the center hub, a lockup piston axially movable relative to the piston housing member along the center hub toward and away from the cover shell to position the hydrokinetic torque coupling device into and out of a lockup mode, a friction device disposed axially between the lockup piston and the cover shell, a first hydraulic chamber defined between the lockup piston and the piston housing member, and a second hydraulic chamber defined between the lockup piston and the cover shell. The center hub has a first hydraulic channel hydraulically connected to the first hydraulic chamber and a second hydraulic channel hydraulically connected to the second hydraulic chamber so as to operate the lockup clutch. The first hydraulic fluid passage is hydraulically connected to the first hydraulic chamber through the first hydraulic channel. The second hydraulic fluid passage is hydraulically connected to the second hydraulic chamber through the second hydraulic channel. The third hydraulic fluid passage is hydraulically connected to a torus chamber defined between the impeller wheel and the turbine wheel.

According to a second aspect of the present invention, there is provided a method for assembling a hydrokinetic torque-coupling device for coupling together a driving shaft and a driven shaft. The method involves the steps of providing the driven shaft having a first hydraulic fluid passage formed axially through the driven shaft, providing an impeller wheel comprising an impeller shell and impeller blades fixedly attached to the impeller shell, a turbine wheel comprising a turbine shell and turbine blades fixedly attached to the turbine shell, and a stator, assembling a torque converter by arranging the stator axially between the impeller wheel and the turbine wheel and coaxially aligned therewith, providing a cover shell and a center hub, and non-moveably attaching the center hub to the cover shell. The center hub has a first hydraulic channel and a second hydraulic channel therethrough. The method further involves the steps of providing a lock-up clutch including a piston housing member, a lockup piston and a friction device, non-moveably attaching the piston housing member to the center hub, mounting the lockup piston to the center hub so as to be axially movable toward and away from the cover shell to position the lock-up clutch into and out of a lockup mode, and to form a first hydraulic chamber hydraulically connected to the first hydraulic passage and defined between the lockup piston, the piston housing member and the center hub, mounting the friction device axially between the lockup piston and the cover shell, non-moveably attaching the cover shell to the impeller shell so as to form a second hydraulic chamber hydraulically connected to the second hydraulic passage and defined between the lockup piston, the cover shell and the center hub, operatively coupling a hollow stationary stator shaft to the stator, and non-rotatably coupling the driven shaft to the turbine shell by axially extending the driven shaft through the stationary stator shaft and forming a second hydraulic fluid passage and a third hydraulic fluid passage. The second hydraulic fluid passage is formed radially between the stationary stator shaft and the driven shaft, and extends generally axially. The third hydraulic fluid passage is formed radially adjacent to the stationary stator shaft and extends generally axially. The third hydraulic fluid passage is radially spaced and fluidly separated from the second hydraulic fluid passage. The first hydraulic fluid passage is hydraulically connected to the first hydraulic chamber through the first hydraulic channel and configured to supply hydraulic fluid to the first hydraulic chamber. The second hydraulic fluid passage is hydraulically connected to the second hydraulic chamber through the second hydraulic channel and is configured to supply the hydraulic fluid to the second hydraulic chamber. The third hydraulic fluid passage is hydraulically connected to a torus chamber defined between the impeller shell and the turbine shell.

According to other aspects of the invention:

the center hub could be configured to center the cover shell, the lockup piston and the piston housing member with respect to the rotational axis.

the center hub may includes a first stepped portion disposed outside the casing and defining a substantially cylindrical radially outer first peripheral surface having a first radius and adapted for positioning into a crankshaft of an internal combustion engine for centering the casing of the torque-coupling device.

the center hub further may includes a second stepped portion axially inwardly offset from the first stepped portion and defining a substantially cylindrical radially outer second peripheral surface having a second radius and configured for centering the cover shell with respect to the rotational axis on the center hub, and wherein the second radius exceeds the first radius.

the center hub further may includes a third stepped portion axially inwardly offset from the second stepped portion and defining a substantially cylindrical outer third peripheral surface, wherein the lockup piston is axially slidably mounted to the third peripheral surface, wherein the third peripheral surface has a third radius and is configured for centering the lockup piston with respect to the rotational axis on the center hub, and wherein the third radius exceeds the second radius.

the third peripheral surface of the center hub could be configured for centering the piston housing member with respect to the rotational axis on the center hub.

the center hub further may includes a fourth stepped portion axially inwardly offset from the third stepped portion and extending radially above the third peripheral surface defining a substantially cylindrical radially outer fourth peripheral surface having a fourth radius, wherein the fourth peripheral surface of the center hub defines an axial position of the piston housing member relative to the center hub, and wherein the fourth radius exceeds the third radius.

the center hub further may includes a substantially cylindrical radially inner fifth peripheral surface having a fifth radius.

hydrokinetic torque-coupling device may further comprises a turbine hub non-rotatably connected to the turbine shell, wherein the turbine hub is rotatable relative to the center hub, and wherein the fifth peripheral surface of the center hub centers the turbine hub with respect to the rotational axis.

the hydrokinetic torque-coupling device may further comprises a radial hearing disposed radially between the fifth peripheral surface of the center hub and a substantially cylindrical radially outer peripheral surface of the turbine hub.

the hydrokinetic torque-coupling device may further comprises a thrust hearing disposed radially within the fifth peripheral surface of the center hub and axially between the center hub and the turbine hub.

the center hub further may includes a substantially cylindrical radially inner sixth peripheral surface axially outwardly offset from the fifth peripheral surface and having a sixth radius, wherein the fifth radius exceeds the sixth radius, and wherein the sixth peripheral surface of the center hub centers the driven shaft with respect to the rotational axis.

a torsional vibration damper may comprises an input member linked to the friction device, a plurality of circumferentially acting first torque transmitting elastic members and an output member, the output member being elastically coupled to the friction device through the first torque transmitting elastic members; the output member having an annular centering surface complementary to a centering surface formed by the input member, the centering surface of the output member being disposed adjacent to and facing the centering surface of the input member to center the friction the torsional vibration damper with regards to the friction device.

the hydrokinetic torque-coupling device may comprises also a first scaling member disposed between a stator shaft and the turbine hub to create a seal at the interface of the stator shaft and the turbine hub, and a second sealing member disposed between the turbine hub and the cover hub to create a seal at the interface of the turbine hub and the driven shaft.

Other aspects of the invention, including apparatus, devices, systems, converters, processes, and the like which constitute part of the invention, will become more apparent upon reading the following detailed description of the exemplary embodiments.

BRIEF DESCRIPTION OF DRAWINGS

FIG. 1 is a sectional view of a hydrokinetic torque-coupling device in accordance with a first exemplary embodiment of the present invention;

FIG. 2 is an enlarged view of a fragment of the hydrokinetic torque-coupling device shown in the circle "2" of FIG. 1;

FIG. 3 is a partial sectional view of the hydrokinetic torque-coupling device in accordance with the first exemplary embodiment of the present invention without a torque converter;

FIG. 4 is a partial sectional view of the hydrokinetic torque coupling device in accordance with the first exemplary embodiment of the present invention, showing a torsional vibration damper and a lockup clutch without a casing;

FIG. 5A is a perspective view of a retainer plate of the torsional vibration damper and a friction disc of a lock-up clutch in accordance with the first exemplary embodiment of the present invention;

FIG. 5B is a fragmentary perspective view of the second retainer plate of the torsional vibration damper and the friction disc of the lock-up clutch in accordance with the first exemplary embodiment of the present invention;

FIG. 6 is a partial sectional view of the hydrokinetic torque coupling device in accordance with the first exemplary embodiment of the present invention, showing the lockup clutch;

FIG. 7 is a partial sectional view of the hydrokinetic torque coupling device in accordance with the first exemplary embodiment of the present invention, showing a piston housing member mounted to a center hub;

FIG. 8 is a partial sectional view of the hydrokinetic torque coupling device in accordance with the first exemplary embodiment of the present invention, showing the torque converter;

FIG. 9 is a partial sectional view of the hydrokinetic torque coupling device in accordance with the first exemplary embodiment of the present invention, showing alternative configuration of a friction disc;

FIG. 10 is an enlarged view of a fragment of the hydrokinetic torque-coupling device shown in the circle "10" of FIG. 9;

FIG. 11A is a perspective view of the second retainer plate of the torsional vibration damper and the alternative configuration of the friction disc;

FIG. 11B is a fragmentary perspective view of the second retainer plate of the torsional vibration damper and the alternative configuration of the friction disc;

FIG. 12 is a sectional view of a hydrokinetic torque-coupling device in accordance with a second exemplary embodiment of the present invention;

FIG. 13 is a partial sectional view of the hydrokinetic torque coupling device in accordance with the second exemplary embodiment of the present invention, showing the torque converter;

FIG. 14 is a partial sectional view of the hydrokinetic torque coupling device in accordance with the second exemplary embodiment of the present invention, showing alternative configuration of a friction disc;

FIG. 15 is a sectional view of a hydrokinetic torque-coupling device in accordance with a third exemplary embodiment of the present invention;

FIG. 16 is a sectional view of an alternative configuration of the hydrokinetic torque-coupling device in accordance with the third exemplary embodiment of the present invention;

FIG. 17 is a sectional view of a hydrokinetic torque-coupling device in accordance with a fourth exemplary embodiment of the present invention;

FIG. 18 is a sectional view of an alternative configuration of the hydrokinetic torque-coupling device in accordance with the fourth exemplary embodiment of the present invention;

FIG. 19 is a sectional view of a hydrokinetic torque-coupling device in accordance with a fifth exemplary embodiment of the present invention; and FIG. 20 is a sectional view of an alternative configuration of the hydrokinetic torque-coupling device in accordance with the fifth exemplary embodiment of the present invention.

BEST MODE FOR CARRYING OUT THE INVENTION

Reference will now be made in detail to exemplary embodiments and methods of the invention as illustrated in the accompanying drawings, in which like reference characters designate like or corresponding parts throughout the drawings. It should be noted, however, that the invention in its broader aspects is not limited to the specific details, representative devices and methods, and illustrative examples shown and described in connection with the exemplary embodiments and methods.

This description of exemplary embodiments is intended to be read in connection with the accompanying drawings, which are to be considered part of the entire written description. In the description, relative terms such as "horizontal," "vertical," "up," "down," "upper", "lower", "right", "left", "top" and "bottom" as well as derivatives thereof (e.g., "horizontally," "downwardly," "upwardly," etc.) should be construed to refer to the orientation as then described or as shown in the drawing figure under discussion. These relative terms are for convenience of description and normally are not intended to require a particular orientation. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise. The term "operatively connected" is such an attachment, coupling or connection that allows the pertinent structures to operate as intended by virtue of that relationship. The term "integral" (or "unitary") relates to a part made as a single part, or a part made of separate components fixedly (i.e., non-moveably) connected together. Additionally, the word "a" and "an" as used in the claims means "at least one" and the word "two" as used in the claims means "at least two".

A hydrokinetic torque-coupling device in accordance with a first exemplary embodiment of the present invention is generally represented in the accompanying drawings by reference numeral 10, as best shown in FIGS. 1 and 2. The hydrokinetic torque-coupling device 10 is intended to couple a driving and a driven (or turbine) shaft 2, for example of a motor vehicle. In this case, the driving shaft is an output shaft (i.e., crankshaft) 8 of an internal combustion engine (ICE) 6 of the motor vehicle and the driven shaft 2 is an input shaft of an automatic transmission of the motor vehicle.

The hydrokinetic torque-coupling device 10 comprises a sealed casing 12 filled with a fluid, such as oil or transmission fluid, and rotatable about a rotational axis X, a hydrokinetic torque converter 14, a lock-up clutch $16_1$ and an elastic damping device (or torsional vibration damper) $18_1$. Hereinafter the axial and radial orientations are considered with respect to the rotational axis X of the torque-coupling device 10. Both the lock-up clutch 16₁ and the torsional vibration damper 18₁ are disposed within the casing 12.

The sealed casing 12, the torque converter 14, the lock-up clutch 16₁ and the torsional vibration damper 18₁ are all rotatable about the rotational axis X. The drawings discussed herein show half-views, that is, a cross-section of the portion or fragment of the hydrokinetic torque-coupling device 10 above the rotational axis X. As is known in the art, the torque-coupling device 10 is symmetrical about the rotational axis X. Hereinafter the axial and radial orientations are considered with respect to the rotational axis X of the torque-coupling device 10. The relative terms such as "axially," "radially," and "circumferentially" are with respect to orientations parallel to, perpendicular to, and circularly around the rotational axis X, respectively.

The sealed casing 12 according to the exemplary embodiment as illustrated in FIG. 1 includes a first shell (or cover shell) 20, and a second shell (or impeller shell) 22 disposed coaxially with and axially opposite to the first shell 20. The first and second shells 20, 22 are non-movably (i.e., fixedly) interconnected and sealed together about their outer peripheries, such as by weld 21. The first shell 20 is non-movably (i.e., fixedly) connected to the driving shaft, more typically to the output shaft of the ICE through a flexplate 9 that is non-rotatably fixed to the driving shaft 8, so that the casing 12 turns at the same speed at which the engine 6 operates for transmitting torque. Specifically, in the illustrated embodiment of FIG. 1, the casing 12 is rotatably driven by the ICE 6 and is non-rotatably coupled to the driving shaft 8 thereof, such as with studs 13 through the flexplate 9. Typically, the studs 13 are fixedly secured, such as by welding, to the first shell 20. Each of the first and second shells 20, 22 are integral or one-piece and may be made, for example, by press-forming one-piece metal sheets.

The casing 12 further includes an annular center hub 24 non-moveably attached (i.e., fixed) to a radially inner end of the cover shell 20, such as by weld 25. The center hub 24 is configured to center the cover shell 20 with respect to the rotational axis X during the assembly of the torque-coupling device 10. The torque converter 14 comprises an impeller wheel (sometimes referred to as the pump, impeller assembly or impeller) 26, a turbine wheel (sometimes referred to as the turbine assembly or turbine) 28, and a stator (sometimes referred to as the reactor) 30 interposed axially between the impeller wheel 26 and the turbine wheel 28. The impeller wheel 26, the turbine wheel 28, and the stator 30 are coaxially aligned with one another and the rotational axis X. The impeller wheel 26, the turbine wheel 28, and the stator 30 collectively form a torus. The impeller wheel 26 and the turbine wheel 28 may be fluidly coupled to one another in operation as known in the art. In other words, the turbine wheel 28 is hydro-dynamically drivable by the impeller wheel 26.

The impeller wheel 26 comprises the impeller shell 22, an annular (or cylindrical) impeller hub 23 coaxial to the rotational axis X and fixedly (i.e., non-moveably) attached to the impeller shell 22 (i.e., formed unitarily (or non-moveably) with the impeller shell 22, for example, as a single-piece part), a substantially annular impeller core ring 31, and a plurality of impeller blades 32 fixedly (i.e., non-moveably) attached, such as by brazing, to the impeller shell 22 and the impeller core ring 31. The impeller shell 22 is an integral (or unitary) component, e.g., made of a single part or separate components fixedly connected together.

The turbine wheel 28, as best shown in FIG. 1, comprises a substantially annular, semi-toroidal (or concave) turbine shell 34 rotatable about the rotational axis X, a substantially annular turbine core ring 35, and a plurality of turbine blades 36 fixedly (i.e., non-moveably) attached, such as by brazing, to the turbine shell 34 and the turbine core ring 35. The turbine shell 34, the turbine core ring 35 and the turbine blades 36 are conventionally formed by stamping from steel blanks. The impeller shell 22 and the turbine shell 34 collectively define a substantially toroidal inner chamber (or torus chamber) $C_T$ therebetween.

The stator 30 is positioned between the impeller wheel 26 and the turbine wheel 28 to redirect fluid from the turbine wheel 28 back to the impeller wheel 26 in an efficient manner. The stator 30 is typically mounted on a one-way (or overrunning) clutch 44 to prevent counter-rotation of the stator 30. A first thrust bearing 38 is interposed between a first side bearing ring 37₁ of the stator 30 and the impeller shell 22 of the casing 12, while a second thrust bearing 38₂ is interposed between a second side bearing ring 37₂ of the stator 30 and the turbine shell 34.

The turbine wheel 28 is non-rotatably secured to a turbine (or output) hub 40 by appropriate means, such as by rivets 42 or welding. The turbine hub 40 is non-rotatably coupled to the driven shaft 2 with splines 43. The turbine hub 40 is rotatable about the rotational axis X and is coaxial with the driven shaft 2 so as to center the turbine wheel 28 on the driven shaft 2 with respect to the rotational axis X. Conventionally, the turbine blades 36 of the turbine wheel 28 interact, in known manner, with the impeller blades 32 of the impeller wheel 26. The stator 30 is operatively coupled to a hollow stationary (i.e., immobile) stator shaft 4 through the one-way (or overrunning) clutch 44. The driven shaft 2 axially extends through the hollow stationary stator shaft 4, as best shown in FIGS. 1, 8 and 9.

The stator 30 is non-rotatably coupled to the stator shaft 4 through the one-way clutch 44. At low turbine shaft speeds, the impeller wheel 26 causes hydraulic fluid to flow from the impeller wheel 26 to the turbine wheel 28, and then flow back to the impeller wheel 26 through the stator 30, providing a first power flow path. The stator 30 is held against rotation by the one-way clutch 44 such that it can redirect the fluid flow and provide a reaction torque for torque multiplication. The one-way clutch 44 permits rotation of the stator 30 in one direction only. In other words, the stator 30 is typically mounted on the one-way clutch 44 to prevent the stator 30 from counter-rotation.

The one-way clutch 44 includes an outer ring 45₁ mounted within a central stator hub bore 30a of the stator 30 coaxially with the rotational axis X, an inner ring 45₂ coaxial to the rotational axis X, and a plurality of clutch elements 45₃, such as sprigs or rockers, circumferentially disposed in an annular space defined between the outer ring 45₁ and the inner ring 45₂. The clutch elements 45₃ permit rotation of the stator 30 in one direction only and prevent rotation of the stator 30 in the other (opposite) direction. The one-way clutch 44 is supported to rotate with respect to the stationary shaft 4. The stationary shaft 4 is adapted to be fixed to the front support of a transmission. An inner peripheral surface of the inner ring 45₂ has splines 48 for non-rotatably coupling to a radially outer periphery of the stator shaft 4. In other words, the inner ring 45₂ is splined to the stationary stator shaft 4.

An annular bushing 46, made of metal or plastic, is disposed radially between the impeller hub 23 and the stator shaft 4. The bushing 46 includes one or more axially extending channels 47 therethrough (best shown in FIGS. 1 and 8) providing fluid flow path through the bushing 46 in the axial direction of the rotational axis X.

The lock-up clutch $16_1$ of the torque-coupling device 10 includes a friction disc $50_1$, a generally annular lockup piston (or pressure plate) 52, both axially movable to and from the cover shell 20, and an annular piston housing member 54 axially spaced from the cover shell 20 so that the lockup piston 52 is disposed between the piston housing member 54 and the cover shell 20. The piston housing member 54 is formed unitarily (or non-moveably) with the center hub 24 of the cover shell 20, i.e., the piston housing member 54 is non-moveably attached (i.e., fixed) to the center hub 24 of the cover shell 20, such as by weld 51, or formed with the impeller shell 22 as a single-piece part.

The friction disc $50_1$ includes a generally radially orientated friction portion (or friction ring) 56 and one or more driving tabs (or abutment elements) $58_1$ extending axially and radially outwardly from the friction portion 56 of the friction disc $50_1$. Moreover, the driving tabs $58_1$ are equiangularly and equidistantly spaced from each other. The friction portion 56 of the exemplary embodiment is in the form of a flat (i.e., planar) annular ring. The annular friction portion 56 of the friction disc $50_1$ has axially opposite friction faces $56_1$ and $56_2$, best shown in FIG. 6. The friction face $56_1$ of the friction disc $50_1$ (defining an engagement surface of the friction disc $50_1$) faces the locking surface 12s defined on the first shell 20 of the casing 12. An annular friction liner 57 is attached to each of the friction faces $56_1$ and $56_2$ of the friction disc $50_1$, such as by adhesive bonding, as shown in FIG. 4. The friction disc $50_1$ with the driving tabs $58_1$ is preferably an integral (or unitary) part, e.g., made of a single or unitary component, but may be separate components fixedly connected together. Preferably, the driving tabs $58_1$ are integrally press-formed on the friction disc $50_1$ so as to be equiangularly spaced from each other.

As best shown in FIG. 2, each of the driving tabs $58_1$ of the friction disc $50_1$ has an annular (e.g., substantially cylindrical), radially outer peripheral surfaces 58s, which defines a centering surface of the friction disc $50_1$. In fact, the centering surface of the friction disc 50 is defined by a number (four in the first exemplary embodiment of the present invention) of the driving tabs $58_1$ of the friction disc $50_1$, as best shown in FIG. 5A.

The lock-up clutch $16_1$ of the torque-coupling device 10 is disposed between the torsional vibration damper $18_1$ and the cover shell 20. The torsional vibration damper $18_1$ includes an input (or drive) member in the form of the friction disc $50_1$, a plurality of circumferentially acting first torque transmitting elastic members (springs) $83_1$, an intermediate member 84 elastically coupled to the driving tabs $58_1$ of the friction disc $50_1$ through the first elastic members $83_1$, a plurality of circumferentially acting second torque transmitting elastic members (springs) $83_2$, and an output (or driven) member 33 elastically coupled to the intermediate member 84 through the second elastic members $83_2$. The output member 33 is non-rotatably coupled to the turbine hub 40, such as by welding 41. The first elastic members $83_1$ (also referred to herein as radially outer damper elastic members) are disposed in series relative to each other between the input member $50_1$ and the intermediate member 84, while the second elastic members $83_2$ (also referred to herein as radially inner damper elastic members) are disposed in series relative to each other between the intermediate member 84 and the output member 33, as best shown in FIGS. 3 and 4.

The intermediate member 84 includes a substantially annular first retainer plate 84A, and a substantially annular second retainer plate 84B disposed axially opposite the first retainer plate 84A, as best shown in FIGS. 3 and 4. The first and second retainer plates 84A, 84B are mounted adjacent to axially opposite sides (surfaces) of the driven member 33 so as to be oriented parallel to each other and coaxially with the rotation axis X. The first and second retainer plates 84A, 84B are non-movably (i.e., fixedly) secured to one another by appropriate means, such as by fasteners 87 or welding, so as to be rotatable relative to the output member 33. Thus, the first and second retainer plates 84A, 84B are non-rotatable relative to one another, but rotatable relative to the output member 33 and the input member $50_1$. Moreover, the second elastic members $83_2$ are disposed circumferentially in series between the output member 33 and the first and second retainer plates 84A, 84B. Specifically, the second elastic members $83_2$ are interposed axially between the first and second retainer plates 84A, 84B.

As best shown in FIGS. 3 and 4, the second retainer plate 84B includes an engagement member 85 extending axially outwardly from an outer flange 84Bf of the second retainer plate 84B toward the first elastic members $83_1$ and the driving tabs 58 of the friction disc $50_1$, and one or more first abutment elements $86_1$. According to the exemplary embodiment of the present invention, the engagement member 85 is integrally press-formed with the second retainer plate 84B. Alternatively, the engagement member 85 may be formed separately from the with the intermediate member 84, then non-rotatably connected to at least one of the first and second retainer plates 84A, 84B of the intermediate member 84. The engagement member 85 is disposed radially outside of the first elastic members $83_1$ so as to at least partially house the first elastic members $83_1$ within the engagement member 85. The first abutment elements $86_1$ are integrally press-formed with the engagement member 85 of the second retainer plate 84B so as to be equiangularly spaced from each other. The first abutment elements $86_1$ have circumferentially opposite abutment surfaces on circumferential ends of the mutually facing first abutment elements $86_1$.

The second retainer plate 84B further includes one or more second abutment elements $86_2$ extending axially outwardly from an outer flange 84Bf of the second retainer plate 84B toward the first elastic members $83_1$ and the driving tabs 58 of the friction disc $50_1$. According to the exemplary embodiment of the present invention, the second abutment elements $86_2$ are non-movably (i.e., fixedly) secured to the second retainer plate 84B by appropriate means, such as by fasteners 89 or welding, so as to be rotatable relative to the input member $50_1$. Thus, the first and second abutment elements $86_1$, $86_2$ are non-rotatable relative to one another, but rotatable relative to the input member $50_1$. The second abutment elements $86_2$ are equiangularly spaced from each other. The second abutment elements $86_2$ have circumferentially opposite abutment surfaces on circumferential ends of the mutually facing the second abutment elements $86_2$. Each of the first elastic members $83_1$ is disposed circumferentially between the driving tabs 58 of the drive member $50_1$ and the second abutment elements $86_2$ of the second retainer plate 84B of the intermediate member 84.

The friction disc $50_1$ is axially moveable along the rotational axis X to and from a locking surface 12s of the casing 12 so as to selectively engage the friction disc $50_1$ against the locking surface 12s of the casing 12. The lockup piston 52 is mounted to the center hub 24 so as to be rotatable relative thereto and the piston housing member 54. The lockup piston 52 is non-rotatably coupled to the piston housing member 54, such as by means of a set of elastic tongues 60, which are arranged substantially on one circumference, and which are oriented tangentially between the piston housing member 54 and the lockup piston 52, while permitting relative axial displacement thereof.

As best shown in FIG. 2, each of the driving tabs $58_1$ has a V-shaped configuration, including a slanted portion $59_{11}$ extending radially outwardly from the friction portion 56 of the friction disc $50_1$ at an oblique angle relative to the rotational axis X, and an axial portion $59_{12}$. As further shown in FIG. 2, the engagement member 85 of the second retainer plate 84B has a free distal end 85e adjacent to the radially outer peripheral surfaces (i.e., centering surfaces) 58s of the driving tabs $58_1$ of the friction disc $50_1$. The free distal end 85e of the engagement member 85 is provided with an annular (e.g., substantially cylindrical), radially inner peripheral surface 85es, best shown in FIG. 2, adjacent to and facing the radially outer peripheral surfaces 58s of the driving tabs $58_1$. Moreover, the radially inner surface 85es of the free distal end 85e of the engagement member 85 is complementary to the radially outer peripheral surfaces 58s (i.e., the centering surfaces) of the driving tabs $58_1$. Thus, the radially inner peripheral surface 85es of the free distal end 85e of the engagement member 85 defines a centering surface of the engagement member 85. When the friction disc $50_1$ rotates below a certain speed, the radially outer peripheral surfaces 58s of the driving tabs $58_1$ of the friction disc $50_1$ contact the radially inner surface 85es of the free distal end 85e of the engagement member 85, thus centering the friction disc $50_1$ with respect to the intermediate member 84 of the torsional vibration damper $18_1$.

Alternatively, as illustrated in FIGS. 9-11B, the torque-coupling device 10 may include a lock-up clutch $16_2$ including a friction disc $50_2$ that has one or more driving tabs $58_2$ extending axially and radially outwardly from the friction portion 56 of the friction disc $50_2$. Each of the driving tabs $58_2$ has a U-shaped configuration, including a first axial portion $59_{21}$ extending axially from the friction portion 56 of the friction disc $50_2$, a radial portion $59_R$ extending radially outwardly from the first axial portion $59_{11}$, and a second axial portion $59_{22}$. As best shown in FIG. 10, the free distal end 85e of the engagement member 85 of the second retainer plate 84B is adjacent to radially outer peripheral surfaces 58s of the driving tabs $58_1$. Moreover, the radially inner surface 85es of the free distal end 85e of the engagement member 85 is adjacent to and facing the radially outer peripheral surfaces 58s of the driving tabs $58_2$, as shown in FIG. 10. Furthermore, the radially inner surface 85es of the free distal end 85e of the engagement member 85 is complementary to the radially outer peripheral surfaces 58s of the driving tabs $58_2$. When the friction disc $50_2$ rotates below a certain speed, the radially outer peripheral surfaces 58s of the driving tabs $58_2$ of the friction disc $50_2$ contact the radially inner surface 85es of the free distal end 85e of the engagement member 85, thus centering the friction disc $50_2$ with respect to the intermediate member 84 of the torsional vibration damper $18_2$.

The torsional vibration damper $18_1$ further includes a pendulum oscillator 19 in turn including a substantially annular support plate 88 and at least one pair of (i.e., first and second) pendulum masses 90 (or flyweights) pivotally mounted to the annular support plate 88. The annular support plate 88 is disposed axially between the first and second retainer plates 84A, 84B, as best shown in FIGS. 3 and 4, and is non-movably (i.e., fixedly) secured to the first and second retainer plates 84A, 84B by appropriate means, such as by the fasteners 87 or welding, so as to be non-rotatable relative to the intermediate member 84.

The first and second pendulum masses 90 are arranged (mounted) axially on axially opposite sides of the support plate 88. The first and second flyweights 90 are connected axially to one another by at least one connecting member 92 passing axially through an associated opening 93 in a radially outer end of the support plate 88. According to the exemplary embodiment, the pendulum oscillator 19 includes three pairs of the first and second flyweights 90, and each pair of the first and second flyweights 90 is connected axially to one another by two connecting members 92 passing axially through the associated openings 93 in the support plate 88. The pendulum oscillator 19 may include one or more pairs of the first and second flyweights 90. In the illustrated embodiment of FIG. 4, the first and second flyweights 90 are substantially structurally and functionally similar.

The first and second flyweights 90 are configured to oscillate with respect to the support plate 88 in a rotation plane orthogonal to the rotation axis X. Accordingly, in reaction to rotational irregularities of the internal combustion engine, each of the first and second flyweights 90 shifts so that a center of mass thereof oscillates in pendulum fashion. The oscillation frequency of each of the first and second flyweights 90 is proportional to the rotation speed of the crankshaft 8 of the internal combustion engine. This pendulum motion of the first and second flyweights 90 allows vibrations and rotational irregularities of the engine to be damped and absorbed.

The lockup piston 52 has a radial plate portion 53p and a cylindrical outer portion 53o extending from a radially outer end of the plate portion 53p toward the piston housing member 54 in the axial direction, as best shown in FIG. 6. The cylindrical outer portion 53o of the lockup piston 52 is supported slidably in the axial direction on a radially outer end 55o of the piston housing member 54. Extending axially at a radially inner peripheral end of the plate portion 53p of the lockup piston 52 is a substantially cylindrical flange 53f that is proximate the rotational axis X relative to the cylindrical outer portion 53o of the lockup piston 52. The cylindrical flange 53f of the lockup piston 52 is rotatable and axially moveable relative to the center hub 24. The lockup piston 52 with the plate portion 53p, the outer portion 53o and the cylindrical flange 53f is an integral (or unitary) component, e.g., made of a single part, for example, by press-forming one-piece metal sheets, or includes separate components fixedly connected together.

The radially outer end 55o of the piston housing member 54 is formed with an annual groove 62 configured to receive an O-ring 64 therein, as best shown in FIG. 7. The O-ring 64 is in sliding contact with the cylindrical outer portion 53o of the lockup piston 52. The sealing member (e.g., O-ring) 64 creates a seal at the interface of the substantially cylindrical outer portion 53o of the lockup piston 52 and the piston housing member 54. Similarly, a radially outer surface of the center hub 24 includes an annular slot (or seal groove) 66 for receiving a sealing member, such as an O-ring 67, as best shown in FIGS. 6 and 7. The sealing member (e.g., O-ring) 67 creates a seal at the interface of the substantially cylindrical flange 53f and the center hub 24. As discussed in further detail below, the lockup piston 52 is axially movably relative to the center hub 24 along this interface. Thus, a hydraulically scaled first hydraulic chamber C11 is defined between the lockup piston 52, the piston housing member 54 and the center hub 24, as best shown in FIGS. 1 and 3. A second hydraulic chamber C21, best shown in FIGS. 1 and 3. [not shown in FIG.] is defined between the lockup piston 52, the cover shell 20 and the center hub 24. The rest of an internal cavity of the casing 12 (i.e., other than the first hydraulic chamber C11 and the second hydraulic chamber C21), which includes the torus chamber $C_T$) defines a third hydraulic chamber C31, shown in FIG. 1 [not shown in FIG.].

The center hub 24 has a first stepped portion $70_1$ disposed outside the casing 12 and defining a substantially cylindrical radially outer first peripheral surface $72_1$ having a first radius $R_1$, a second stepped portion $70_2$ axially inwardly offset from the first stepped portion $70_1$ and defining a substantially cylindrical radially outer second peripheral surface $72_2$ having a second radius $R_2$, a third stepped portion $70_3$ axially inwardly offset from the second stepped portion $70_2$ and defining a substantially cylindrical outer third peripheral surface $72_3$ having a third radius $R_3$, and a fourth stepped portion $70_4$ axially inwardly offset from the third stepped portion $70_3$ and defining a substantially cylindrical radially outer fourth peripheral surface $72_4$ having a fourth radius $R_4$, as best shown in FIG. 6. As further illustrated in FIG. 6.

a. the first radius $R_1$ the second radius $R_2$,
b. the second radius $R_2$ the third radius $R_3$,
c. the third radius $R_3$ the fourth radius $R_4$.

The center hub 24 further has an inner stepped axial bore including a substantially cylindrical radially inner fifth peripheral surface $72_5$ having a fifth radius $R_5$, and a substantially cylindrical radially inner sixth peripheral surface $72_6$ axially outwardly offset from the fifth peripheral surface $72_5$ and having a sixth radius $R_6$, as best shown in FIG. 7. As further illustrated in FIG. 7, the fifth radius $R_5$>the sixth radius $R_6$.

The center hub 24 is rotatable relative to both the driven shaft 2 and the turbine hub 40. Accordingly, an annual groove 74 is formed that accommodates a sealing member, such as an O-ring 75 that is in sliding contact with the sixth peripheral surface $72_6$ of the third stepped portion $70_3$ of the center hub 24, as best shown in FIG. 7. Moreover, a radial bearing 76 (such as a metal or plastic bushing) is disposed radially between the fifth peripheral surface $72_5$ of the center hub 24 and a substantially cylindrical radially outer peripheral surface of the turbine hub 40, and a thrust hearing 78 (such as a metal or plastic bushing) is disposed axially between the center hub 24 and the turbine hub 40.

The first peripheral surface $72_1$ of the first stepped portion $70_1$ of the center hub 24 is positioned into the engine crankshaft 8 for centering the torque-coupling device 10 with respect to the crankshaft 8 of the engine 6 of the motor vehicle during assembly. The second peripheral surface $72_2$ of the second stepped portion $70_2$ of the center hub 24 centers the cover shell 20 with respect to the rotational axis X during welding of the center hub 24. The third peripheral surface $72_1$ of the third stepped portion $70_3$ of the center hub 24 centers the piston 52 and the piston housing 54 with respect to the rotational axis X. The third stepped portion $70_3$ of the center hub 24 also includes the seal grove 66. The fifth peripheral surface $72_5$ of the center hub 24 centers the turbine hub 40 with respect to the rotational axis X by being pressed in the busing 76. The sixth peripheral surface $72_6$ of the center hub 24 centers the driven shaft 2 with respect to the rotational axis X and dynamically seals the driven shaft 2 to separate the first and second hydraulic chambers C11 and C21.

The radially outer end 55o of the piston housing member 54 is placed on the third peripheral surface $72_3$ of the third stepped portion $70_3$ in contact with the fourth stepped portion $70_4$ of the center hub 24 so as to define an innermost axial position of the piston housing member 54 relative to the center hub 24. Then, the piston housing member 54 is non-moveably attached (i.e., fixed) to the fourth stepped portion $70_4$ of the center hub 24, such as by weld 51. Thus, the piston housing member 54 and the center hub 24 are non-movably (i.e., fixedly) interconnected and sealed together.

The driven shaft 2 is provided with a central bore $2a$ therethrough, which is coaxial with the rotational axis X. The central bore $2a$ defines a first hydraulic fluid passage extending generally axially. An annular cavity radially between the stator shaft 4 and the driven shaft 2 and radially between the turbine hub 40 and the driven shaft 2 defines a second hydraulic fluid passage 3 extending generally axially. As best shown in FIG. 1, the first hydraulic fluid passage $2a$ and the second hydraulic fluid passage 3 are independent and distinct. An annular cavity located radially between a cylindrical inner peripheral surface of the impeller hub 23 and the stator shaft 4 (including the one or more axial channels 47 through the bushing 46) defines a third hydraulic fluid passage 5 extending generally axially. As best shown in FIG. 1, the first hydraulic fluid passage $2a$, the second hydraulic fluid passage 3 and the third hydraulic fluid passage 5 are independent and distinct, i.e., fluidly separated from each other.

The center hub 24 is provided with a first hydraulic channel $82_1$ and a second hydraulic channel $82_2$, both in the form of a cylindrical bore. The first hydraulic channel $82_1$ fluidly (or hydraulically) interconnects the first hydraulic chamber C11 with the first hydraulic fluid passage $2a$ in the driven shaft 2. The second hydraulic channel $82_2$ hydraulically interconnects the second hydraulic chamber C21 with the second hydraulic fluid passage 3. It should be understood that one or more spline teeth (such as in the splines 43) between the turbine hub 40 and the driven shaft 2 were removed for allowing hydraulic fluid flow from the second hydraulic fluid passage 3 to the second hydraulic chamber C21 through the second hydraulic channel $82_2$.

The lock-up clutch $16_1$ is closed (or engaged) when the lockup piston 52 is displaced axially toward the cover shell 20 under the effect of hydraulic pressure so as to engage (or clamp) the friction portion 56 of the friction disc $50_1$ between the cover shell 20 and the lockup piston 52. When the lock-up clutch $16_1$ is closed and the friction portion 56 of the friction disc $50_1$ is engaged against the cover shell 20 by action of the lockup piston 52, the engine torque is passed from the casing 12 to the friction disc $50_1$. Thus, when under the effect of hydraulic pressure the lockup piston 52 clamps the friction portion 56 of the friction disc $50_1$ between itself and the cover shell 20 of the casing 12, the locking of the lock-up clutch $16_1$ permits direct driving of the driven shaft 2 by the splines 43 on the turbine hub 40 from the casing 12, non-rotatably connected to the crankshaft 8 of the engine 6 of the motor vehicle, through the torsional vibration damper $18_1$ without jolts, and vibrations from the engine are filtered.

The hydraulic fluid, such as oil, that is supplied under pressure to the first hydraulic chamber C11 through the first hydraulic fluid passage $2a$ and the first hydraulic channel $82_1$ (as marked with an arrow F1 in FIG. 1), causes the lockup piston 52 to move axially toward the cover shell 20 and press the friction disc $50_1$ against the cover shell 20 so that the friction disc $50_1$ frictionally non-rotatably engages the cover shell 20 in a lockup position (or mode). The hydraulic fluid that is supplied under pressure to the second hydraulic chamber C21 through the second hydraulic fluid passage 3 and the second hydraulic channel $82_2$ (as marked with the arrow F2 in FIG. 1), causes the lockup piston 52 to move axially away from the cover shell 20 and release the friction disc $50_1$ so that the friction disc $50_1$ frictionally disengages from the cover shell 20 in a non-lockup position (or mode). The hydraulic fluid passes from the torus chamber $C_T$ of the third hydraulic chamber C31 through the first thrust hearing $38_1$ and the third hydraulic fluid passage 5 (as marked with the arrow F3 in FIG. 1), which includes one or more axial channels 47 through the bushing 46.

A sealing member 80, mounted to a radially inner peripheral surface $45_{2S}$ of the inner ring $45_2$ of the one-way clutch 44, creates a seal at the interface of the inner ring $45_2$ of the one-way clutch 44 and a radially outer sealing surface $40s$ of the turbine hub 40, as best shown in FIG. 8. The sealing member 80 between the inner ring $45_2$ of the one-way clutch 44 of the stator 30 and the turbine hub 40 to prevent the oil leakage from the second hydraulic chamber C21.

Various modifications, changes, and alterations may be practiced with the above-described embodiment, including but not limited to the additional embodiments shown in FIGS. 12-18. In the interest of brevity, reference characters in FIGS. 12-18 that are discussed above in connection with FIGS. 1-11B are not further elaborated upon below, except to the extent necessary or useful to explain the additional embodiments of FIGS. 12-18. Modified components and parts are indicated by the addition of a hundred, two hundreds, etc. digit to the reference numerals of the components or parts.

In a hydrokinetic torque-coupling device 110 of a second exemplary embodiment illustrated in FIGS. 12 and 13, the stationary stator shaft 4 is replaced by a stationary stator shaft 104. The hydrokinetic torque-coupling device 110 of FIGS. 12 and 13 corresponds substantially to the hydrokinetic torque-coupling device 10 of FIGS. 1-11B, and portions, which differ, will therefore be explained in detail below.

An annular bushing 146, made of metal or plastic, is disposed radially between the impeller hub 23 and a hollow, stationary stator shaft 104. The bushing 146 does not include one or more axial channels therethrough, and thus prevents hydraulic fluid flow between the impeller hub 23 and the stator shaft 104 in axial direction of the rotational axis X.

A generally cylindrical sleeve 108 is fixed (i.e., non-moveably secured) to the stationary stator shaft 104, for example by press-fitting. The sleeve 108 is radially spaced from the stationary stator shaft 104 so as to define a third hydraulic fluid passage 105 between the sleeve 108 and the stationary stator shaft 104. The stationary stator shaft 104 has one or more radial hydraulic channels 106 extending generally radially therethrough and fluidly connecting the third hydraulic fluid passage 105 with an annular cavity 115 located radially between a cylindrical inner peripheral surface of the impeller hub 23 and the stator shaft 104. As best shown in FIGS. 12-14, the one or more radial hydraulic channels 106 extend substantially radially, i.e., substantially perpendicularly (or, at a right angle) with respect to the rotational axis X. The third hydraulic fluid passage 105 is fluidly connected with the torus chamber $C_T$ through the one or more hydraulic channels 106. An annular cavity radially between the stator shaft 104 and the driven shaft 2, and radially between the turbine hub 40 or the sleeve 108 and the driven shaft 2 defines a second hydraulic fluid passage 103.

The hydraulic fluid, such as oil, that is supplied under pressure to a first hydraulic chamber C12 through the first hydraulic fluid passage 2a and the first hydraulic channel $82_1$ (as marked with an arrow F11 in FIG. 12), causes the lockup piston 52 to move axially toward the cover shell 20 and press the friction disc $50_1$ against the cover shell 20 so that the friction disc $50_1$ frictionally non-rotatably engages the cover shell 20 in a lockup position (or mode). The hydraulic fluid that is supplied under pressure to a second hydraulic chamber C22 through the second hydraulic fluid passage 103 and the second hydraulic channel $82_2$ (as marked with the arrow F21 in FIG. 12), causes the lockup piston 52 to move axially away from the cover shell 20 and release the friction disc $50_1$ so that the friction disc $50_1$ frictionally disengages from the cover shell 20 in a non-lockup position (or mode). The hydraulic fluid (as marked with an arrow F32 in FIG. 12) passes from the torus chamber $C_T$ of a third hydraulic chamber C31 through the first thrust hearing $38_1$ to the annular cavity 115, and from the annular cavity 115 to the third hydraulic fluid passage 105 (best shown in FIG. 13) through the radial hydraulic channels 106.

The lock-up clutch $16_1$ is closed (or engaged) when the lockup piston 52 is displaced axially toward the cover shell 20 under the effect of hydraulic pressure so as to engage (or clamp) the friction portion 56 of the friction disc $50_1$ between the cover shell 20 and the lockup piston 52. When the lock-up clutch $16_1$ is closed and the friction portion 56 of the friction disc $50_1$ is engaged against the cover shell 20 by action of the lockup piston 52, the engine torque is passed from the casing 12 to the friction disc $50_1$. Thus, when under the effect of hydraulic pressure the lockup piston 52 clamps the friction portion 56 of the friction disc $50_1$ between itself and the cover shell 20 of the casing 12, the locking of the lock-up clutch $16_1$ permits direct driving of the driven shaft 2 by the splines 43 on the turbine hub 40 from the casing 12, non-rotatably connected to the crankshaft 8 of the engine 6 of the motor vehicle, through the torsional vibration damper $18_1$ without jolts, and vibrations from the engine are filtered.

The hydraulic fluid, such as oil, that is supplied under pressure to the first hydraulic chamber C12 through the first hydraulic fluid passage 2a and the first hydraulic channel $82_1$ (as marked with the arrow F11 in FIG. 12), causes the lockup piston 52 to move axially toward the cover shell 20 and press the friction disc $50_1$ against the cover shell 20 so that the friction disc $50_1$ frictionally non-rotatably engages the cover shell 20 in a lockup position (or mode). The hydraulic fluid that is supplied under pressure to the second hydraulic chamber C22 through the second hydraulic fluid passage 103 and the second hydraulic channel $82_2$ (as marked with the arrow F21 in FIG. 12), causes the lockup piston 52 to move axially away from the cover shell 20 and release the friction disc $50_1$ so that the friction disc $50_1$ frictionally disengages from the cover shell 20 in a non-lockup position (or mode). The hydraulic fluid passes from the torus chamber $C_T$ of the third hydraulic chamber C32 through the first thrust beating $38_1$ and the third hydraulic fluid passage 105 (as marked with the arrow F31 in FIG. 12), which includes one or more radial hydraulic channels 106 through the sleeve 108.

In a hydrokinetic torque-coupling device 210 of a third exemplary embodiment illustrated in FIG. 15, the output hub 40, the lock-up clutch $16_1$ and the torsional vibration damper $18_1$ are replaced by an output hub 240, a lock-up clutch 216 and a torsional vibration damper 218. The hydrokinetic torque-coupling device 210 of FIG. 15 corresponds substantially to the hydrokinetic torque-coupling device 110 of FIGS. 12-13, and portions which differ will therefore be explained in detail below.

The turbine wheel 28 is non-rotatably secured to a turbine flange 239 by appropriate means, such as by mechanical fasteners 242 or welding. In turn, the turbine flange 239 and an output member 233 of the torsional vibration damper 218 are non-rotatably secured to an output hub 240 by appropriate means, such as by rivets 241 or welding. The output hub 240 is non-rotatably coupled to the driven shaft 2 with splines 243. The output hub 240 is rotatable about the rotational axis X and is coaxial with the driven shaft 2 so as to center the turbine wheel 28 on the driven shaft 2 with respect to the rotational axis X. Moreover, a radial hearing 277 (such as a metal or plastic bushing) is disposed radially between the radially inner sixth peripheral surface $72_6$ of the center hub 24 and a substantially cylindrical radially outer peripheral surface of the driven shaft 2. The stator 30 is coupled in rotation to a stationary stator shaft 204 through the one-way (or overrunning) clutch 44.

The lock-up clutch 216 of the torque-coupling device 210 is placed between the torsional vibration damper 218 and the cover shell 20. The lock-up clutch 216 of the torque-coupling device 210 comprises a radially inner (or first) disc carrier 268 non-movably secured (i.e., fixed), such us by welding or mechanical fastener(s), to the cover shell 20 of the casing 12, a radially outer (or second) disc carrier 269, one or more annular drive (or friction) rings 256, each non-rotatably coupled the radially outer disc carrier 269, and one or more annular driven (or counter) discs 271, each non-rotatably coupled to the inner disc carrier 268, as best shown in FIGS. 15 and 16. As best shown in FIGS. 15 and 16, each of the annular friction rings 256 and each of the annular counter discs 271 extends radially between the inner disc carrier 268 and the outer disc carrier 269. Each of the friction rings 256 of the third exemplary embodiment is in the form of a flat (i.e., planar) annular ring. The annular friction rings 256 have axially opposite friction faces. An annular friction liner 257 is attached to each of the axially opposite friction faces of each of the friction rings 256, such as by adhesive bonding, as best shown in FIGS. 15 and 16. The friction rings 256 and the counter discs 271 together define a clutch pack 294 radially extending between the inner disc carrier 268 and the outer disc carrier 269.

The inner disc carrier 268 is a cylindrical drum member formed with splines, i.e., a plurality of axially extending radially outer teeth. Similarly, the outer disc carrier 269 is a cylindrical drum member formed with splines, i.e., a plurality of axially extending radially inner teeth. A radially outer portion of each of the friction rings 256 is formed with splines, i.e., interlocking teeth, engaged with the radially inner teeth of the outer disc carrier 269. Accordingly, the friction rings 256 are non-rotatable but axially moveable relative to the outer disc carrier 269. Similarly, a radially inner portion of each of the counter discs 271 is formed with splines, i.e., interlocking teeth, engaged with the radially outer teeth of the inner disc carrier 268. Accordingly, the counter discs 271 are non-rotatable but axially moveable relative to the inner disc carrier 268. The friction rings 256 alternate with the counter discs 271. The friction rings 256 are axially moveable along the rotational axis X to and from the cover shell 20 of the casing 12, as best shown in FIG. 15. Similarly, the counter discs 271 are axially moveable along the rotational axis X to and from the cover shell 20 of the casing 12.

A lockup piston 252 of the lock-up clutch 216 is non-rotatably coupled to a piston housing member 254, such as by means of a set of elastic tongues 260, which are arranged substantially on one circumference, and which are oriented tangentially between the piston housing member 254 and the lockup piston 252, while permitting relative axial displacement thereof.

The torsional vibration damper 218 includes an input (or drive) member in the form of one or more driving tabs (or abutment elements) 258 extending axially and radially outwardly from the outer disc carrier 269 of the lock-up clutch 216. Moreover, the driving tabs 258 are equiangularly and equidistantly spaced from each other. The input member 258 of the torsional vibration damper 218 is non-rotatably connected to the outer disc carrier 269 of the lock-up clutch 216 by an appropriate means, such as by rivets 273 (as shown in FIGS. 15 and 16, or welding, or by adhesive bonding. The input member 258 comprises a portion $258_1$ which is intended to be in sliding contact with a tab $286_3$ belonging to the intermediate member 284. This portion $258_1$ is disposed radially inward of the tab $286_3$ and is permanently in sliding contact with the tab $286_3$. The portion $258_1$ forms a centering device with regards to the torsional vibration damper 218. The portion $258_1$ is linked to the radially outer disc carrier 269 of the lock-up clutch 216. The tab $286_3$ forms an annular part non-moveably mounted on the outer flange 284BF of the second retainer plate 284B.

A generally cylindrical sleeve 208 is fixed (i.e., non-moveably secured) to the stationary stator shaft 204, for example by press-fitting. The sleeve 208 is radially spaced from the stationary stator shaft 204 so as to define a third hydraulic fluid passage 205 between the sleeve 208 and the stationary stator shaft 204. The stationary stator shaft 204 has one or more slanted hydraulic channels 206 extending generally radially therethrough and fluidly connecting the third hydraulic fluid passage 205 with an annular cavity 215 located radially between a cylindrical inner peripheral surface of the impeller hub 23 and the stator shaft 204. As best shown in FIGS. 15 and 16, the one or more radial hydraulic channels 206 are slanted, i.e., extend at an oblique angle with respect to the rotational axis X. The third hydraulic fluid passage 205 is fluidly connected with the torus chamber $C_T$ through the one or more hydraulic channels 206. An annular cavity radially between the stator shaft 204 and the driven shaft 2, and radially between the output hub 240 or the sleeve 208 and the driven shaft 2 defines a second hydraulic fluid passage 203.

The hydraulic fluid, such as oil, that is supplied under pressure to a first hydraulic chamber C13 through the first hydraulic fluid passage 2a and the first hydraulic channel $82_1$ (as marked with an arrow F12 in FIG. 15), causes the lockup piston 252 to move axially toward the cover shell 20 so as to frictionally engage the lock-up clutch 216 in a lockup position (or mode). The hydraulic fluid that is supplied under pressure to a second hydraulic chamber C23 through the second hydraulic fluid passage 203 and the second hydraulic channel $82_2$ (as marked with an arrow F22 in FIG. 15), causes the lockup piston 252 to move axially away from the cover shell 20 so as to frictionally disengage the lock-up clutch 216 in a non-lockup position (or mode). The hydraulic fluid (as marked with an arrow F32 in FIG. 15) passes from the torus chamber $C_T$ of a third hydraulic chamber C33 through the first thrust hearing $38_1$ to the annular cavity 215, and from the annular cavity 215 to the third hydraulic fluid passage 205 (best shown in FIG. 15) through the slanted hydraulic channels 206.

A scaling member 80, mounted to a radially inner peripheral surface of the inner ring $45_2$ of the one-way clutch 44, creates a seal at the interface of the inner ring $45_2$ of the one-way clutch 44 and a radially outer sealing surface 240s of the output hub 240. The scaling member 80 between the inner ring $45_2$ of the one-way clutch 44 of the stator 30 and the output hub 240 to prevent the oil leakage from the second hydraulic chamber C23.

The hydrokinetic torque-coupling device 210 further comprises a thrust washer 98 disposed axially between the center hub 24 and the output member 233 of the torsional vibration damper 218, as best shown in FIG. 15. The thrust washer 98 is made of resin or any appropriate low-friction polymeric material.

An alternative configuration of the hydrokinetic torque-coupling device 210 is generally depicted by reference numeral 210' in FIG. 16. The hydrokinetic torque-coupling device 210' of FIG. 16 corresponds substantially to the hydrokinetic torque-coupling device 210 of FIG. 15, and portions, which differ, will therefore be explained in detail below. Specifically, in the hydrokinetic torque-coupling device 210' the turbine flange 239 and the output hub 240 are replaced by an output hub 240' having a unitary turbine flange 296'. In the hydrokinetic torque-coupling device 210', the turbine wheel 28 is non-rotatably secured to the turbine flange 296' of the output hub 240' by appropriate means, such as by rivets 242' or welding. In other words, the output hub 240' is directly non-moveably connected (i.e., fixed) to the turbine wheel 28. In turn, the turbine flange 296' of the output hub 240' and an output member 233 of the torsional vibration damper 218 are non-rotatably secured to one another by appropriate means, such as by rivets 241' or welding. The turbine flange 239 of the hydrokinetic torque-coupling device 210 is thicker and more robust than the turbine flange 296' of the hydrokinetic torque-coupling device 210'. Accordingly, the hydrokinetic torque-coupling device 210 is designed for trucks and sport utility vehicles ("SUVs"), while the hydrokinetic torque-coupling device 210' is designed for smaller vehicles, such as cars.

In a hydrokinetic torque-coupling device 310 of a fourth exemplary embodiment illustrated in FIG. 17, the output hub 240 is replaced by an output hub 340. The hydrokinetic torque-coupling device 310 of FIG. 17 corresponds substantially to the hydrokinetic torque-coupling device 210 of FIG. 15. and portions, which differ, will therefore be explained in detail below.

The output hub 340 is rotatable relative to the stationary stator shaft 104. Accordingly, an annual groove 341 is formed on the output hub 340 that accommodates a sealing member, such as an O-ring 380. The O-ring 380 is in sliding contact with a substantially cylindrical, radially inner peripheral surface of the stationary stator shaft 104. The annual groove 341 is formed on a radially outer sealing surface 340s of the output hub 340. The sealing member (e.g., O-ring) 380 creates a seal at the interface of the cylindrical radially inner peripheral surface of the stationary stator shaft 104 and radially outer sealing surface 340s of the output hub 340.

An alternative configuration of the hydrokinetic torque-coupling device 310 is generally depicted by reference numeral 310' in FIG. 18. The hydrokinetic torque-coupling device 310' of FIG. 18 corresponds substantially to the hydrokinetic torque-coupling device 310 of FIG. 17, and portions, which differ, will therefore be explained in detail below. Specifically, in the hydrokinetic torque-coupling device 310' the turbine flange 239 and the output hub 340 are replaced by an output hub 340' having a unitary turbine flange 396'. In the hydrokinetic torque-coupling device 310', the turbine wheel 28 is non-rotatably secured to the turbine flange 396' of the output hub 340' by appropriate means, such as by rivets 242' or welding. In other words, the output hub 340' is directly non-moveably connected (i.e., fixed) to the turbine wheel 28. In turn, the turbine flange 396' of the output hub 340' and an output member 233 of the torsional vibration damper 218 are non-rotatably secured to one another by appropriate means, such as by rivets 241' or welding. The turbine flange 239 of the hydrokinetic torque-coupling device 310 is thicker and more robust than the turbine flange 396' of the hydrokinetic torque-coupling device 310'. Accordingly, the hydrokinetic torque-coupling device 310 is designed for trucks and SUVs, while the hydrokinetic torque-coupling device 310' is designed for smaller vehicles, such as cars.

In a hydrokinetic torque-coupling device 410 of a fifth exemplary embodiment illustrated in FIG. 19, the lock-up clutch 216 is replaced by a lock-up clutch 416. The hydrokinetic torque-coupling device 410 of FIG. 19 corresponds substantially to the hydrokinetic torque-coupling device 410 of FIG. 17, and portions, which differ, will therefore be explained in detail below.

A lockup piston 452 of the lock-up clutch 416 is non-rotatably coupled to a piston housing member 454 by means of an anti-rotation mechanism 460, while permitting axial displacement of the lockup piston 452 relative to the piston housing member 454. The an anti-rotation mechanism 460 includes one or more cavities $461_1$ formed in the lockup piston 452, and one or more complementary protrusions $461_2$ formed in the piston housing member 454. The number of the cavities $461_1$ in the lockup piston 452 preferably corresponds to the number of the protrusions $461_2$ on the piston housing member 454. Moreover, the cavities $461_1$ in the lockup piston 452 are complementary to the protrusions $461_2$ on the piston housing member 454, and are arranged substantially on one circumference. The protrusions $461_2$ on the piston housing member 454 drivingly engage the cavities $461_1$ in the lockup piston 452 so as to non-rotatably couple the lockup piston 452 to the piston housing member 454, while permitting relative axial displacement of the lockup piston 452 relative to the piston housing member 454.

An alternative configuration of the hydrokinetic torque-coupling device 410 is generally depicted by reference numeral 410' in FIG. 20. The hydrokinetic torque-coupling device 410' of FIG. 20 corresponds substantially to the hydrokinetic torque-coupling device 410 of FIG. 19, and portions, which differ, will therefore be explained in detail below. Specifically, in the hydrokinetic torque-coupling device 410' the turbine flange 239 and the output hub 340 are replaced by an output hub 340' having a unitary turbine flange 396'. In the hydrokinetic torque-coupling device 410', the turbine wheel 28 is non-rotatably secured to the turbine flange 396' of the output hub 340' by appropriate means, such as by rivets 242' or welding. In other words, the output hub 340' is directly non-moveably connected (i.e., fixed) to the turbine wheel 28. In turn, the turbine flange 396' of the output hub 340' and an output member 233 of the torsional vibration damper 218 are non-rotatably secured to one another by appropriate means, such as by rivets 241' or welding. The turbine flange 239 of the hydrokinetic torque-coupling device 410 is thicker and more robust than the turbine flange 396' of the hydrokinetic torque-coupling device 410'. Accordingly, the hydrokinetic torque-coupling device 410 is designed for trucks and SUVs, while the hydrokinetic torque-coupling device 410' is designed for smaller vehicles, such as cars.

The foregoing description of the exemplary embodiments of the present invention has been presented for the purpose of illustration in accordance with the provisions of the Patent Statutes. It is not intended to be exhaustive or to limit the invention to the precise forms disclosed. The embodiments disclosed hereinabove were chosen in order to best illustrate the principles of the present invention and its practical application to thereby enable those of ordinary skill in the art to best utilize the invention in various embodiments and with various modifications as suited to the particular use contemplated, as long as the principles described herein are followed. This application is therefore intended to cover any variations, uses, or adaptations of the invention using its general principles. Further, this application is intended to cover such departures from the present disclosure as come within known or customary practice in the art to which this invention pertains. Thus, changes can be made in the above-described invention without departing from the intent and scope thereof. It is also intended that the scope of the present invention be defined by the claims appended thereto.

The invention claimed is:

1. A hydrokinetic torque-coupling device for coupling together a driving shaft and a driven shaft rotatable about a rotational axis, comprising:
  an impeller wheel, a turbine wheel including a turbine shell, and a stator interposed axially between the impeller wheel and the turbine wheel;
  a casing including a cover shell, an impeller shell non-moveably secured to the cover shell, a turbine hub and a center hub non-moveably attached to the cover shell of the casing;
  a hollow stationary stator shaft operatively coupled to the stator, the driven shaft axially extending through the stationary stator shaft;
  a first hydraulic fluid passage formed axially through the driven shaft;
  a second hydraulic fluid passage formed radially between the stationary stator shaft and the driven shaft; and
  a third hydraulic fluid passage formed radially adjacent to the stationary stator shaft and radially spaced from the second hydraulic fluid passage;
  a first sealing member disposed between a stator shaft and the turbine hub to create a seal at the interface of the stator shaft and the turbine hub, and a second sealing member disposed between the turbine hub and the center hub to create a seal at the interface of the turbine hub and the driven shaft; and
  a lock-up clutch interconnecting the turbine wheel and the casing, the lock-up clutch including
    a piston housing member non-moveably attached to the center hub;
    a lockup piston axially movable relative to the piston housing member along the center hub toward and away from the cover shell to position the hydrokinetic torque coupling device into and out of a lockup mode;
    a friction device disposed axially between the lockup piston and the cover shell;
    a first hydraulic chamber defined between the lockup piston and the piston housing member; and
    a second hydraulic chamber defined between the lockup piston and the cover shell;
  the center hub having a first hydraulic channel hydraulically connected to the first hydraulic chamber and a second hydraulic channel hydraulically connected to the second hydraulic chamber so as to operate the lockup clutch;
  the first hydraulic fluid passage hydraulically connected to the first hydraulic chamber through the first hydraulic channel, the second hydraulic fluid passage hydraulically connected to the second hydraulic chamber through the second hydraulic channel, and the third hydraulic fluid passage hydraulically connected to a torus chamber defined between the impeller wheel and the turbine wheel.

2. The hydrokinetic torque-coupling device as defined in claim 1, wherein the turbine hub is non-rotatably connected to the turbine shell and to the driven shaft.

3. The hydrokinetic torque-coupling device as defined in claim 1, wherein the second hydraulic fluid passage is further defined radially between the turbine hub and the driven shaft.

4. The hydrokinetic torque-coupling device as defined in claim 2, wherein the center hub is rotatable relative to the turbine hub.

5. The hydrokinetic torque-coupling device as defined in claim 2, further comprising a torsional vibration damper comprising: an input member linked to the friction device; a plurality of circumferentially acting first torque transmitting elastic members; and an engagement member elastically coupled to the input member through the first torque transmitting elastic members.

6. The hydrokinetic torque-coupling device as defined in claim 5, wherein the friction device is formed by a friction disc, the input member further including at least one driving tab non-rotatable relative to the friction ring.

7. The hydrokinetic torque-coupling device as defined in claim 5, wherein the friction device comprises a radially inner disc carrier non-rotatably secured to the casing, a radially outer carrier disc, one or more annular drive rings each non-moveably coupled the radially outer disc carrier, and one or more annular driven discs each non-rotatably coupled to the inner disc carrier, the input member being linked to the outer disc carrier.

8. The hydrokinetic torque-coupling device as defined in claim 5, wherein the torsional vibration damper further comprises an intermediate member non-rotatable relative to the engagement member, a plurality of circumferentially acting second torque transmitting elastic members and an output member elastically coupled to the intermediate member through the second torque transmitting elastic members.

9. The hydrokinetic torque-coupling device as defined in claim 8, wherein the intermediate member of the torsional vibration damper is rotatable relative to the turbine hub, and wherein the output member of the torsional vibration damper is non-rotatably connected to the turbine shell.

10. The hydrokinetic torque-coupling device as defined in claim 9, wherein the output member of the torsional vibration damper is non-rotatably connected to the turbine hub.

11. The hydrokinetic torque-coupling device as defined in claim 5, wherein the torsional vibration damper further comprises a pendulum oscillator.

12. The hydrokinetic torque-coupling device as defined in claim 1, further comprising an impeller hub unitary with the impeller shell and coaxial to the rotational axis, and an annular bushing disposed radially between the impeller hub and the stationary stator shaft, wherein the stationary stator shaft extends through the impeller hub, wherein the bushing includes at least one axial channel therethrough providing a fluid flow path through the bushing in an axial direction of the rotational axis, and wherein an annular cavity located radially between a cylindrical inner peripheral surface of the impeller hub and the stator shaft defines the third hydraulic fluid passage including the at least one axial channel through the bushing.

13. The hydrokinetic torque-coupling device as defined in claim 1, wherein the lockup piston is mounted to the center hub so as to be axially movable along the center hub toward and away from the cover shell.

14. The hydrokinetic torque-coupling device as defined in claim 1, wherein the lockup piston is non-rotatable relative to the piston housing member.

15. The hydrokinetic torque-coupling device as defined in claim 1, wherein the first, second and third hydraulic fluid passages are fluidly separated from each other.

16. The hydrokinetic torque-coupling device as defined in claim 1, wherein each of the first, second and third hydraulic fluid passages extending generally axially.

17. The hydrokinetic torque-coupling device as defined in claim 1, wherein the lockup piston is non-rotatably coupled to a piston housing member by means of an anti-rotation mechanism, while permitting axial displacement of the lockup piston relative to the piston housing member.

18. The hydrokinetic torque-coupling device as defined in claim 17, wherein the anti-rotation mechanism includes one or more cavities formed in the lockup piston, and one or more complementary protrusions formed in the piston housing member, the cavities in the lockup piston being complementary to the protrusions on the piston housing member, and being arranged substantially on one circumference.

19. A hydrokinetic torque-coupling device for coupling together a driving shaft and a driven shaft rotatable about a rotational axis, comprising:
- an impeller wheel, a turbine wheel and a stator interposed axially between the impeller wheel and the turbine wheel;
- a casing including a cover shell, an impeller shell non-moveably secured to the cover shell, and a center hub non-moveably attached to the cover shell of the casing;
- a hollow stationary stator shaft operatively coupled to the stator, the driven shaft axially extending through the stationary stator shaft;
- a first hydraulic fluid passage formed axially through the driven shaft;
- a second hydraulic fluid passage formed radially between the stationary stator shaft and the driven shaft;
- a third hydraulic fluid passage formed radially adjacent to the stationary stator shaft and radially spaced from the second hydraulic fluid passage;
- an impeller hub unitary with the impeller shell and coaxial to the rotational axis an annular bushing disposed radially between the impeller hub and the stationary stator shaft;
- a generally cylindrical sleeve non-moveably secured to the stationary stator shaft and radially spaced therefrom so as to define the third hydraulic fluid passage between the sleeve and the stationary stator shaft; and
- a lock-up clutch interconnecting the turbine wheel and the casing, the lock-up clutch including
  - a piston housing member non-moveably attached to the center hub;
  - a lockup piston axially movable relative to the piston housing member along the center hub toward and away from the cover shell to position the hydrokinetic torque coupling device into and out of a lockup mode;
  - a friction device disposed axially between the lockup piston and the cover shell;
  - a first hydraulic chamber defined between the lockup piston and the piston housing member; and
  - a second hydraulic chamber defined between the lockup piston and the cover shell;
- the center hub having a first hydraulic channel hydraulically connected to the first hydraulic chamber and a second hydraulic channel hydraulically connected to the second hydraulic chamber so as to operate the lockup clutch;
- the first hydraulic fluid passage hydraulically connected to the first hydraulic chamber through the first hydraulic channel, the second hydraulic fluid passage hydraulically connected to the second hydraulic chamber through the second hydraulic channel, and the third hydraulic fluid passage hydraulically connected to a torus chamber defined between the impeller wheel and the turbine wheel;
- the stationary stator shaft having at least one hydraulic channel extending generally radially therethrough and fluidly connecting the third hydraulic fluid passage with an annular cavity located radially between the impeller hub and the stator shaft.

20. The hydrokinetic torque-coupling device as defined in claim 19, wherein the stationary stator shaft extends through the impeller hub, and wherein the bushing does not include an axial channel therethrough.

21. The hydrokinetic torque-coupling device as defined in claim 19, wherein the at least one hydraulic channel extends perpendicularly with respect to the rotational axis.

22. The hydrokinetic torque-coupling device as defined in claim 19, wherein the at least one hydraulic channel extends at an oblique angle with respect to the rotational axis.

* * * * *